United States Patent [19]

Blaszkowski

[11] 4,317,073

[45] Feb. 23, 1982

[54] WINDSHIELD WIPER CONTROL SYSTEM

[76] Inventor: Henry Blaszkowski, P.O. Box 114, Southfield, Mich. 48075

[21] Appl. No.: 943,195

[22] Filed: Sep. 18, 1978

Related U.S. Application Data

[60] Division of Ser. No. 765,123, Feb. 3, 1977, Pat. No. 4,131,834, which is a continuation of Ser. No. 549,810, Feb. 13, 1975, abandoned, which is a continuation-in-part of Ser. No. 302,940, Nov. 1, 1972, abandoned, which is a continuation-in-part of Ser. No. 19,443, Mar. 13, 1970, abandoned, Continuation-in-part of Ser. No. 776,487, Nov. 18, 1968, abandoned.

[51] Int. Cl.³ .............................................. H02P 5/16
[52] U.S. Cl. ................................... 318/483; 15/250 C; 318/313; 318/480; 318/DIG. 2
[58] Field of Search ................. 318/483, 313, DIG. 2, 318/480; 340/602, 603, 604, 619; 15/250.12, 250 C; 307/118, 10 R

[56] References Cited

U.S. PATENT DOCUMENTS

| | | | |
|---|---|---|---|
| 3,221,317 | 11/1965 | Ferrigno, Jr. | 340/602 |
| 3,649,898 | 3/1972 | Inoue | 318/483 |
| 3,657,626 | 4/1972 | Rouvre et al. | 15/250.12 |

FOREIGN PATENT DOCUMENTS

| | | | |
|---|---|---|---|
| 2101319 | 7/1972 | Fed. Rep. of Germany | 15/250.12 |
| 2316408 | 10/1974 | Fed. Rep. of Germany | 15/250.12 |
| 1291256 | 10/1972 | United Kingdom | 15/250.12 |
| 1321221 | 6/1973 | United Kingdom | 15/250 C |

*Primary Examiner*—David Smith, Jr.
*Attorney, Agent, or Firm*—Barnes, Kisselle, Raisch & Choate

[57] ABSTRACT

An automatic control system for a vehicle windshield wiper system which includes a plurality of sensors which are activated in response to various degrees of moisture precipitation or rain and an electronic control circuit adapted to be activated by the sensors to start and stop the wiper mechanism and also to operate it intermittently and at low or high speed in accordance with the degree of rain or moisture precipitation.

1 Claim, 17 Drawing Figures

Fig. 6

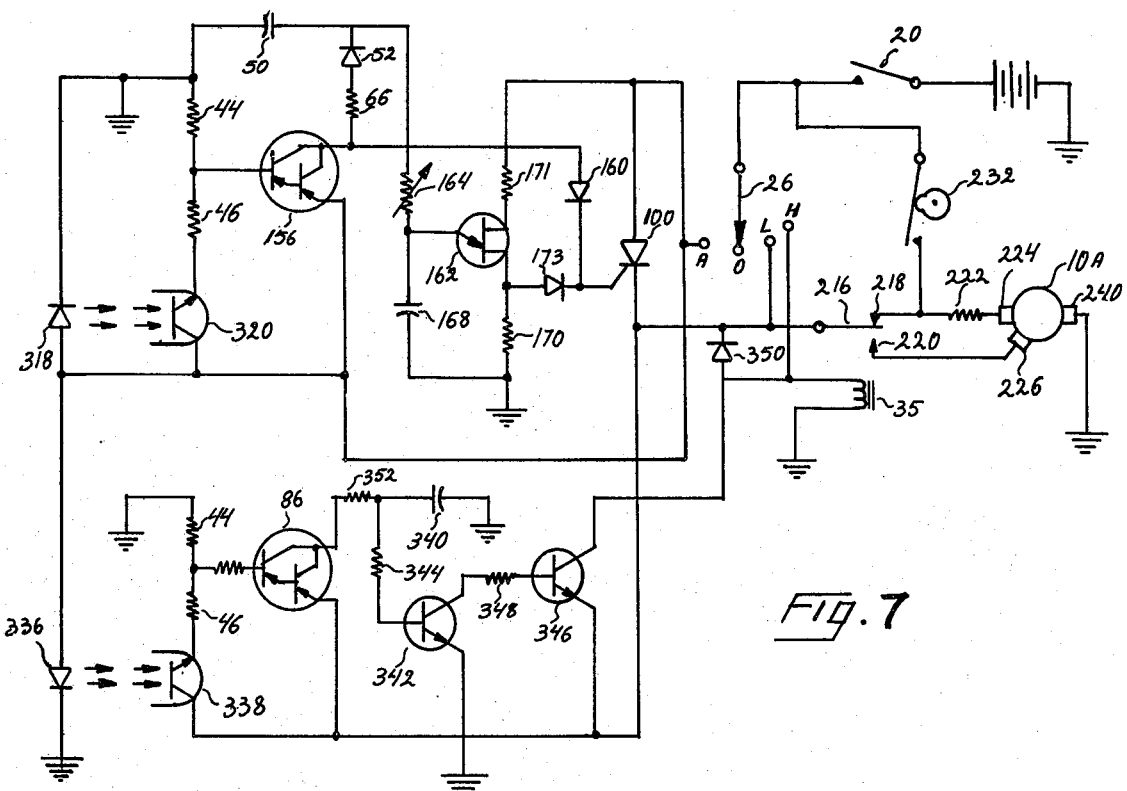
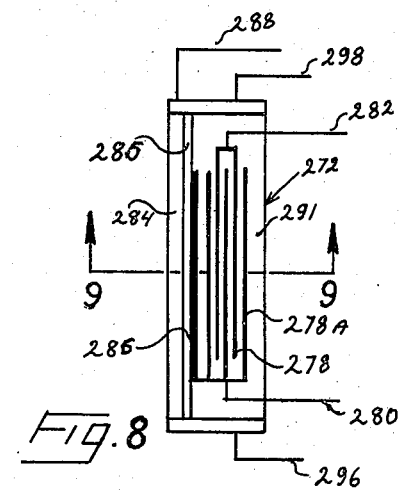
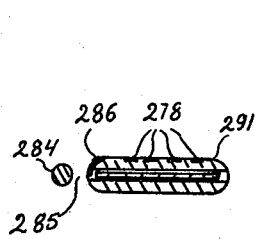
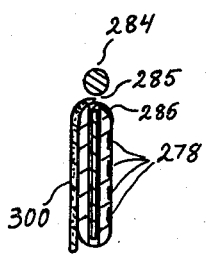
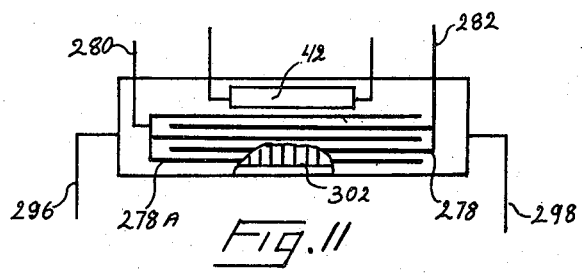
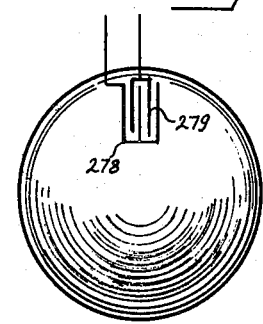

WINDSHIELD WIPER CONTROL SYSTEM

This application is a division of applicant's copending application Ser. No. 765,123, filed Feb. 3, 1977, now U.S. Pat. No. 4,131,834, which, in turn, was a continuation of applicant's prior application Ser. No. 549,810, filed Feb. 13, 1975, the latter application being a continuation-in-part of applicant's prior application Ser. No. 302,940, filed Nov. 1, 1972, that being a continuation-in-part of applicant's prior application Ser. No. 19,443, filed Mar. 13, 1970, which, in turn, was a continuation-in-part of applicant's prior parent application Ser. No. 776,487, filed Nov. 18, 1968, all of the last four-mentioned applications now abandoned.

This invention relates to an automatic control system for electrically operated vehicle windshield wipers, and, more particularly, to a control system for such wipers which includes moisture sensing means for operating the wipers in accordance with the intensity of precipitation.

The primary object of this invention is to provide a windshield wiper control system that is sensitive to moisture precipitation so that the wiper will be automatically turned on whenever precipitation occurs and turned off whenever precipitation stops and the frequency of wiper operation is controlled by the intensity of precipitation.

Accordingly, with the wiper control system of the present invention the wiper starts and operates intermittently with a pause between cycles varying in duration in accordance with precipitation intensity so that in very light rain or drizzle the pause between cycles is relatively long and the pause becomes progressively shorter as the rain intensity increases until the wiper operates continuously when rain intensity increases to a medium level. When the rain intensity increases to a heavy level, the wiper switches automatically to high speed operation and is sustained at high speed until the rain diminishes to a value where the wiper is automatically switched back to slow speed continuous operation, then to intermittent operation when the rain becomes very light and, finally, stops when the rain ceases altogether.

The control system is designed such that the wiper will also start automatically and operate intermittently in fog of predetermined density, e.g., whenever fog is dense enough to precipitate on the vehicle windshield to an extent such as to impair vision.

Another object of this invention is to provide an automatic windshield wiper control system which will operate the wiper intermittently in light rain in response to activation of precipitation sensing means with a pause of predetermined duration between cycles, the pause being substantially immediately cancelled by sudden road back-spray caused by another vehicle or by a sudden increase in rain intensity, even if this occurs at the beginning of such pause, so that the wiper will be switched automatically and substantially immediately into continuous low or high speed operation, depending upon the intensity of the road back-spray or rain.

Another object of this invention is to provide a windshield wiper control system which not only operates in response to activation of precipitation sensing means, but which at the same time is compatible for use with a wiper mechanism which employs an electro-mechanical switch device for positioning the wiper blades in a depressed or recessed park position. In this connection the control system is designed such that, whenever the wiper is operating intermittently, the wiper blades will stop at the end of their normal wiping stroke on and near the lower edge of the windshield without going into recessed park position. However, the control system is designed such that whenever the automatic control circuit is de-activated either manually or automatically the wiper blades are automatically retracted to the recessed park position.

Another object of the invention is to provide an automatic wiper control system which is independent of and does not interfere with the operation of the wiper by the manual controls of a conventional wiper system.

Another object of this invention is to provide an automatic wiper control system which when active is automatically de-activated whenever the vehicle ignition switch is turned off and will not be automatically reactivated when the ignition switch is turned on again, thus requiring the automatic control system to be again activated intentionally when its functioning is desired. This feature is referred to herein as "automatic turn off". Furthermore, when the ignition switch is again turned on the wiper blades will automatically be returned to their normal park position. Alternatively, the system is capable of returning the wiper blades to their final park position after the ignition switch is turned off.

Another object of this invention is to provide an automatic control system for windshield wipers which is adapted to turn the wiper motor on when the windshield washer system is actuated and to turn the wiper motor off automatically after the washer mechanism has stopped applying water to the windshield so that the wiper blades are automatically retracted to their park position, which may be recessed or non-recessed.

Another object of this invention is to provide an electronic control for a windshield washer system wherein the electronic control circuit is programmable to selectively control the duration of the washing cycle in accordance with the need.

Still another object of this invention is to provide an automatic windshield wiper control system which includes moisture or precipitation sensing means which do not require electrodes to be bridged by moisture so that variations in the conductivity of the moisture precipitated will not affect the operation of the automatic control system.

Still another object of the invention is to provide an automatic windshield wiper control system including rain or moisture precipitation sensing means adapted to function equally well in warm or freezing temperatures such that the system is equally adapted for operation in rain and in snow.

The control system of the present invention in its broadest aspects generally comprises one or more rain or moisture precipitation sensing devices in an electronic control circuit which includes switch means for coupling a wiper motor directly or through suitable switch means with a source of power when the sensing device detects moisture precipitation in the form of rain, fog, snow or road back-spray.

The control system of the present invention is adapted to be used in conjunction with any conventional single or multi-speed wiper mechanism with or without a depressed park feature.

In the accompanying drawings several forms of the invention are illustrated (in which drawings similar reference characters designate corresponding parts), in which:

FIGS. 1 through 7 are diagrammatic views illustrating various embodiments of a wiper control system according to the present invention;

FIG. 8 is an elevational view of one form of sensor utilized in the control system;

FIG. 9 is a sectional view along the line 8—8 in FIG. 7;

FIG. 10 is a vertical sectional view of another form of sensor according to the present invention;

FIG. 11 is a plan view, with a section broken away, of a further form of sensor according to the present invention;

FIG. 12 illustrates the use of a sensor mounted on the lens of a light on the vehicle;

Figure 1:
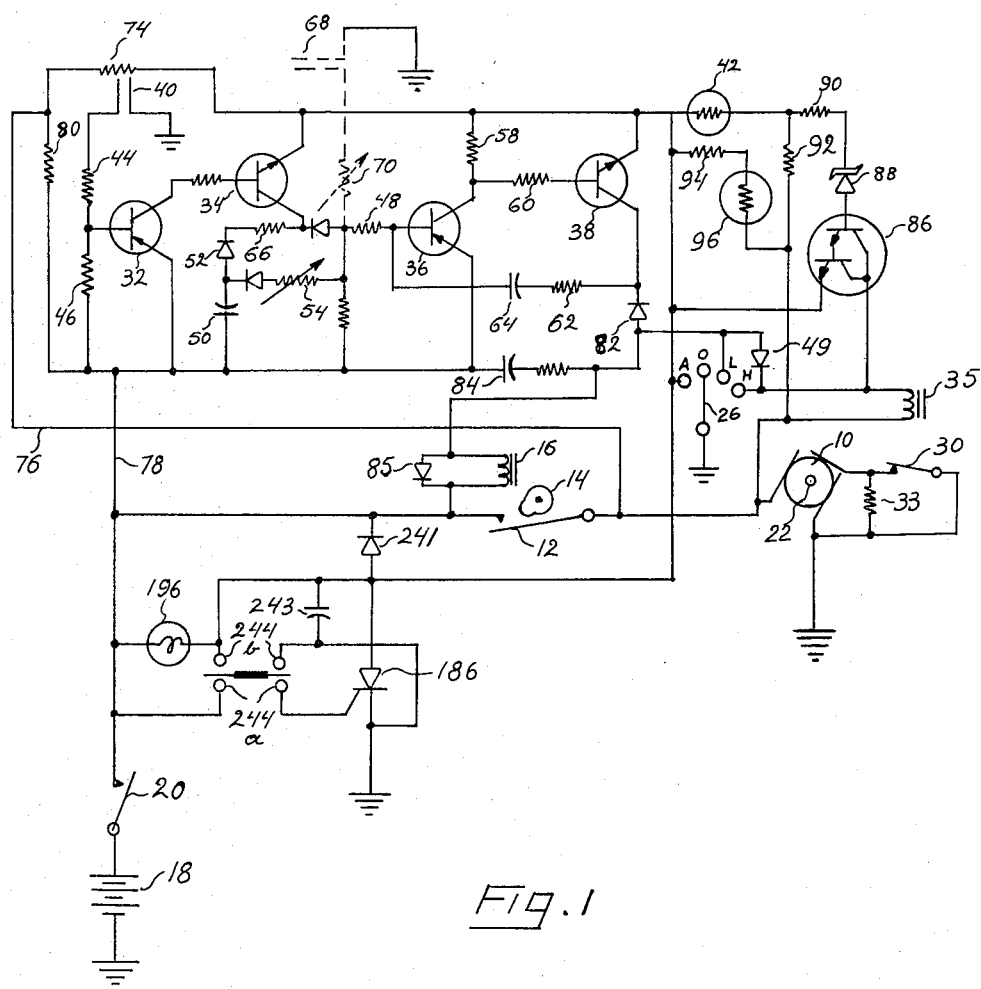

FIG. 1 shows one embodiment of an electronic control circuit of the present invention adapted to control a conventional wiper system of the type having a multi-speed motor 10 and one conventional form of electromechanical recessed parking mechanism comprising a parking switch 12, cam 14 and relay 16. In this recessed parking mechanism, whenever the wiper is turned on manually or automatically, relay coil 16 is energized and switch 12 closes. Switch 12 is retained closed by a spring (not illustrated). Motor 10 is connected with battery 18 through an ignition switch 20. Output shaft 22 of motor 10 is rotated through a reducing gear and reciprocates the wiper blades through a linkage system (not illustrated). The wiper blades make a complete wiping cycle with each revolution of shaft 22. When the wiper is turned off the wiping cycle in progress continues until switch 12 is opened by cam 14. More specifically, when the wiper is turned off, relay coil 16 is de-energized which in turn releases a latch arm (not illustrated) within the parking mechanism. When the latch is released the mechanism for retracting the wiper blades to the recessed parking position is engaged. The recessed parking mechanism is of conventional type, not a part of the invention, and, therefore, not shown. When the recessed parking mechanism is engaged output shaft 22 is shifted to an eccentric position and the stroke of the wiper blade linkage is lengthened, causing the wiper blades to be shifted to the depressed park position. Cam 14, which is mechanically linked with the parking mechanism of the wiper motor, is so arranged that it can only engage and open switch 12 after relay coil 16 has been de-energized and the wiper blades reach the recessed park position.

A movable contact arm 26 of a manual control switch on the dash panel of the vehicle is adapted to selectively engage four contacts designated as A, O, L and H. Contact A is for automatic operation; O for OFF, L for manual low speed and H for manual high speed. The series field winding of motor 10 is connected to the battery through switch 12 and ignition switch 20 and to ground. A shunt field winding which causes the motor to run at low speed is also connected to ground through a normally closed relay switch 30. When relay coil 35 is energized switch 30 opens causing the shunt field to be weakened through resistor 33 and the motor runs at high speed. When arm 26 makes with contact H, relay coil 35 is energized and switch 30 opens. When arm 26 makes with contact A, the electronic control circuit (hereinafter described) energizes relay coil 35 automatically in response to heavy precipitation. When contact arm 26 makes with contact O or L, relay coil 35 is de-energized and switch 30 closes.

The electronic control circuit shown in FIG. 1 comprises four transistors 32,34,36,38 and a Darlington amplifier transistor 86 in circuit with two moisture sensors 40 and 42. Activating energy is supplied to the electronic control circuit when switch arm 26 makes with contact A. Transistors 32 and 34 are connected together to be triggered by and to amplify input potential from sensor 40. Whenever sensor 40 is activated by moisture (rain, precipitating fog, road spray, etc.), input potential is supplied to the base of transistor 32 through resistor 44 and both transistors 32 and 34 conduct. Resistor 44 limits the input potential from sensor 40 and resistor 46 determines the sensitivity of the circuit of transistors 32,34. Transistors 36 and 38 are connected together as shown and are turned on and stay on as long as input potential is supplied to the base of transistor 36 from the collector of transistor 34 through resistor 48. When transistors 36 and 38 conduct, relay coil 16 is energized, switch 12 closes, and motor 10 is energized. However, diode 49 prevents relay coil 35 from being energized by transistors 36,38. When transistors 36,38 stop conducting, relay coil 16 is de-energized, but motor 10 continues to run until cam 14 (which is activated when relay coil 16 is de-energized) opens switch 12, at which point the wiper blades reach the recessed park position as previously described.

To obtain intermittent operation of the wiper, the circuit of transistors 36,38 is designed to turn them on and off repeatedly at a predetermined frequency. The circuit includes a first capacitor 50, resistors 54,56, 48,58,60,62 and a second capacitor 64 connected with transistors 36,38 as shown. The circuit operates as follows: Whenever transistors 32,34 are turned on by input potential from sensor 40, transistors 36,38 conduct continuously and capacitor 50 is charged by the negative output potential of transistor 34 through resistor 66 and diode 52. Whenever input potential from sensor 40 is terminated or drops below the circuit's predetermined sensitivity, transistors 32,34 are turned off and capacitor 50 begins to discharge through resistors 54 and 48. The input potential to the base of transistor 36 is greatly reduced by the high value of resistor 54 and is not sufficient to overcome the charge on capacitor 64. Consequently, the base of transistor 36 cannot be maintained in saturation and transistors 36,38 are turned off. The charge of capacitor 64 leaks off via resistors 48,56,62. Capacitor 50 continues to discharge into the base of transistor 36 until it becomes sufficiently negative to turn transistors 36,38 on again. Capacitor 64 is then charged through resistor 62 until the base of transistor 36 is turned off again. The cycle repeats itself until capacitor 50 is discharged.

The number of repetitive cycles is determined by the size of capacitor 50. The on and off time of the circuit is determined by the value of resistors 54 and 56, capacitor 64, resistor 62 and the load resistance of relay coil 16. Resistor 62 and capacitor 64 largely determine the off time of the circuit, that is, the pause between operating cycles. The off time can be extended by placing a resistor (not illustrated) across capacitor 64. The off time is preferably much longer than the on time and may range from 4 to 10 seconds or more. The on time need only be long enough to keep relay coil 16 energized until the recessed parking mechanism is disengaged. In the recessed parking mechanism described this occurs when the wiper blades have traveled through about one-fourth of their forward or up stroke. If the on time is too short, relay coil 16 is de-energized before the parking mechanism is disengaged and the wiper will be reversed and returned to park position. The circuit can also be adjusted to produce an on time of sufficient duration so that the wiper will make two or three consecutive strokes during each intermittent operating cycle instead of only one as is generally preferred.

When the wiper operates intermittently and the charge on capacitor 50 is dropping, the pause between each intermittent cycle becomes progressively longer. Therefore, in a very light rain when sensor 40 is rewetted less frequently the pause between operating cycles is longer than in a heavier rain which still calls for intermittent, rather than continuous, operation. If desired, resistor 54 may comprise a potentiometer integrated into the manual switch so that the pause between cycles can be controlled by the operator.

The control circuit in this embodiment can employ either one or two sensors for intermittent and low speed continuous operation. The second sensor which can be incorporated is designated 68 and is employed with a variable resistor 70, both of which are shown in broken lines. The second sensor is intended for operating the wiper intermittently and is adapted to be more sensitive than sensor 40. Sensor 68 and resistor 70 can be employed instead of or in addition to capacitor 50. When both capacitor 50 and sensor 68 are employed, a diode 72 can be utilized to prevent charging of capacitor 50 through sensor 68. Resistor 70 in series with sensor 68 is so set that the wiper will operate intermittently as long as sensor 68 remains activated and the precipitation is insufficient to activate sensor 40. Detailed operation of the two-sensor circuit in combination with a high speed sensor will be described hereinafter in connection with other embodiments.

Sensor 40 in FIG. 1 comprises a heated sensor. A heater 74 is employed for drying the sensor. Heater 74 can be continuously energized whenever switch arm 26 makes with contact A by connecting the control circuit and heater 74 to ground potential via conductor 75 as shown. Alternatively, the heating may be effected only during operation of the wiper via conductor 76 which connects heater 74 to positive potential whenever switch 12 closes. Continuous heating via conductor 78 can be direct and maintain the heater at the full desired temperature or the sensor can be lightly heated by employing a resistor 80 in series with heater 78. However, during each operating cycle resistor 80 is bypassed by conductor 76 and heating is direct. When employing only one sensor for both intermittent and continuous low speed operation of the wiper, sensor 40 must be relatively small so that it will not be continuously or too frequently activated in light rain. In addition, the heating must be intense enough to dry the water droplets on the sensor rapidly in light rain so that the wiper switches to intermittent operation following each wetting and drying of the sensor.

For intermittent and low speed operation it is advantageous to heat sensor 40 to the maximum desired temperature only while the motor is running or to heat the sensor continuously lightly by employing resistor 80 in series with heater 74. When the sensor is heated to maximum temperature continuously the heater will not respond to fog. Therefore, as a practical matter it is desirable to utilize conductor 76 as well as resistor 80 for heating the sensor. If the sensor is heated only during operation of the wiper motor it takes longer for the sensor to dry following each wetting in light rain. As a consequence, each wetting can produce several consecutive strokes of the wiper before the sensor dries and the wiper switches to intermittent operation. Therefore, when heater 74 is activated only during wiper motor operation it should be adapted to raise the temperature of the sensor more rapidly than when the sensor is heated continuously. Continuous light heating of sensor 40 causes more rapid temperature rise of the sensor when the motor starts and heating is intensified by bypassing resistor 80.

As soon as sensor 40 dries, capacitor 50 begins to discharge to produce intermittent operation. The value of resistor 66 determines the level of charge the capacitor 50 will store during each wetting of sensor 40. The value of resistor 66 can be such that when the sensor is wetted in light rain and dries during one wiping cycle of the wiper blades any desired number of subsequent intermittent operation cycles can be stored. Consequently, the level of charge reached and maintained on capacitor 50 will depend on the frequency and duration of wetting of sensor 40. Therefore, in very light rain the charge will be lower and the wiping frequency slower than in a medium light rain. Following an extended continuous operation of the wiper in a medium heavy rain capacitor 50 will be fully charged and the maximum number of intermittent cycles of operation will be obtained with diminishing frequency (a progressively longer pause between cycles). Operation in this manner is desirable since it is consistent with the diminishing need for wiper operation as the rain intensity decreases. However, if pauses of constant duration between successive cycles are preferred, the output of capacitor 50 can be amplified in any suitable manner to maintain a constant flow of input potential to the base of transistor 36 for as long as capacitor 50 is sufficiently charged to drive the amplifier. In a light rain, when sensor 40 is briefly wetted during intermittent operation, only a small number of intermittent cycles will be stored with each wetting since capacitor 50 will be only partially charged. When resistor 66 has a very low value or is omitted entirely, capacitor 50 will be fully charged following each wetting even when the sensor is dried substantially immediately. In practical application I have found that a charge on capacitor 50 which will produce five to seven intermittent cycles is sufficient to operate the wiper efficiently in sustained intermittent operation during light rain. The greater the number of stored intermittent cycles, the greater the probability that the sensor will be rewetted while the wiper is operating intermittently solely under the control of capacitor 50. Therefore, visibility will not be impaired in a light rain even though the sensor is not rewetted for a long period of time, e.g., 20 to 45 seconds or more. During this long period of time the wiper operates intermittently with a pause of desired duration between successive wiping cycles.

In FIG. 1 PNP transistors 32,36 and NPN transistors 34,38 are so arranged that the input potential from sensors 40,68 is negative. The output of transistors 34,38 is likewise negative. When the sensors used are of the type where the input potential flows through moisture bridging the electrodes of the sensors, it is preferable that input potential is of ground polarity. Therefore, for a vehicle with positive polarity the transistors in the electronic circuit are connected accordingly.

Diode 82 and capacitor 84 prevent the circuit from being triggered by inductive switching transients in the vehicle electrical system. Capacitor 84 also prevents any chatter of relay coil 16. Diode 85 across relay coil 16 suppresses inductive surges generated by switching of the coil. The other relay coils employed in this and other embodiments illustrated also employ similar surge suppression means.

The circuit of NPN Darlington amplifier transistor 86, Zener diode 88, resistors 90,92 and thermistor 42 is adapted to energize relay coil 35 to open normally closed switch 30 and switch the wiper into high speed continuous operation whenever the thermistor is sufficiently cooled in heavy rain. The negative temperature co-efficient thermistor 42 is used as the sensor. Thermistor 42 is connected to positive potential via resistor 92. It is activated when the circuit to ground is closed by switching arm 26 to make with contact A. Thermistor 42 may be self-heated and, in addition to or instead of, be heated by heater 94. When thermistor 42 is in heat exchange relation with heater 94 the time constant of the thermistor is substantially independent of its own mass, but becomes dependent on the mass of the heater. When a second thermistor 96 having a positive temperature coefficient is added in series with heater 94, the heater and thermistor 42 will be maintained at a relatively constant temperature in the absence of heavy rain. Thermistor 96 is so placed on the vehicle that, although fully exposed to outside temperatures and air cooling while the vehicle is in motion, it is shielded from falling rain. Thermistor 42 is so located as to be readily wetted by rain or road back-spray from passing vehicles. Heating of thermistor 42 is sufficiently high that its temperature will not drop low enough to trigger transistor 86 when the vehicle is traveling at high speed in cold weather during a light rain. In a heavy rain where the thermistor is flooded, it cools rapidly, and, as the temperature of thermistor 42 drops and its resistance increases, positive potential to the gate of transistor 86 increases until it reaches the Zener diode break-down voltage, triggering the transistor into conduction and energizing coil 35. Switch 30 opens and current to the shunt winding is weakened by resistor 33 and the wiper motor runs at high speed until the rain diminishes to a point where the temperature of thermistor 42 increases sufficiently to turn off transistor 86. While Zener diode 88 and transistor 86 provide for better control of the circuit, they may be omitted for economy reasons, in which case relay coil 35 is energized directly by a suitable thermistor.

It is very advantageous to switch the automatic control circuit off permanently whenever the ignition switch is turned off; this feature, which I refer to as "automatic turn off", prevents the control circuit from being activated automatically when the ignition switch is turned on again. Without such a feature, the automatic control may be left on for a long period of time in dry weather when the ignition switch is on. This may be undesirable because the wiper will automatically start when the vehicle goes through a car wash with the ignition switch accidentally left on. The wiper would also start automatically whenever the ignition is turned on on a morning when moisture is condensed on a cold sensor, even though the windshield itself is clear of precipitation. In the arrangement shown in FIG. 1 automatic turn off of the control circuit is accomplished by the use of SCR 186 in combination with a rocker switch 244 biased to a normally off position. Switch 244 is adapted to be momentarily depressed to close with contacts 244a to supply positive potential to the gate of SCR 186 and trigger it into conduction. Activating energy is thus supplied to the control circuit and the sensor heaters. When SCR 186 is conducting and switch 244 is activated to close with contacts 244b, the cathode and anode of SCR 186 are shunted and SCR 186 is turned off. Thus, if the control circuit is activated by switch 244 rather than by switch arm 26, when the ignition switch is thereafter turned off, the circuit is de-activated and will not be activated again when the ignition switch is turned on.

It will be appreciated that the use of the automatic turn off feature described is not limited to sensor controlled wiper mechanisms; this feature can be employed with any wiper mechanism controlled by a conventional manually operated switch to turn the wiper on and off. With a conventional manually controlled wiper mechanism SCR 186 (or an equivalent switch) would be employed in the same manner as is illustrated in FIG. 1 and the negative side of relay coil 16 would simply be connected directly to the anode of SCR 186. Then when the wiper mechanism is turned on by actuation of switch 244 (rather than the conventional manual ON-OFF switch) and turned off by opening the ignition switch, the wiper blades would be retracted to the depressed park position when the ignition switch is reclosed.

Diode 241 and capacitor 243 prevent false triggering of SCR 186 by switching transients in the vehicle electrical circuit. It will be understood that transient protection is provided with all circuits disclosed herein even though not shown in all instances. Similarly, although not shown, the control circuits embody conventional means (thermistors, for example) to compensate for temperature variations which might effect circuit stability. Indicator light 196 is employed not only to indicate that the control has been activated by switch 244, but also to provide a holding load for SCR 186 when intermittent heating of sensor 40 is employed.

Figure 5:
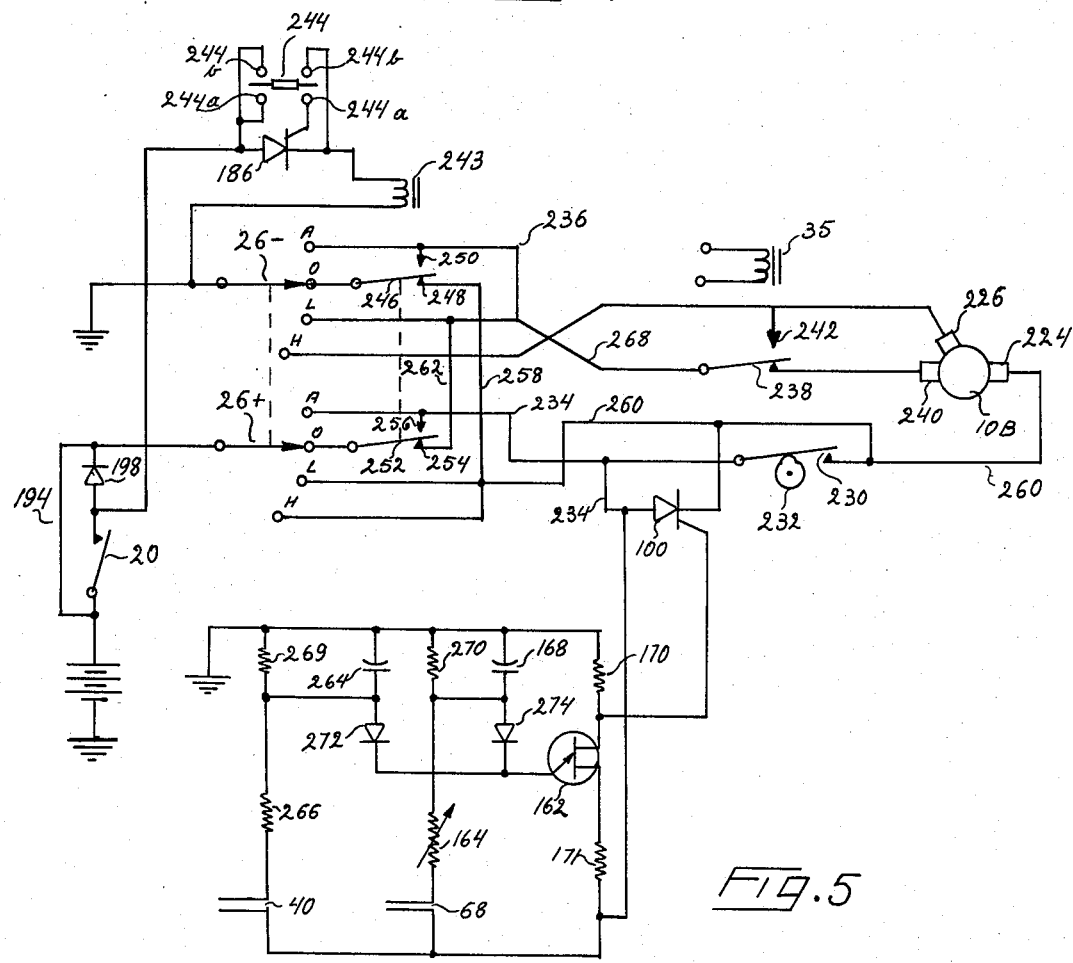

In the arrangement shown in FIG. 1, whenever the wiper system is switched to automatic control and is operating intermittently in light rain, the wiper blades are retracted to the recessed park position at the end of each intermittent wiper cycle. To eliminate excessive wear due to repeated actuation of the recessed parking mechanism it is desirable to stop the wiper blades at the end of the normal operating stroke near the lower edge of the windshield, the position designated NS as in FIG. 10. Another advantage of such arrangement is that, if vision through the windshield is suddenly obstructed by road back-spray occuring during a pause in intermittent operation, the wiper blades operate immediately in the vision area of the windshield without any delay caused by travel from the recessed park position designated RP in FIG. 10. A wiper control system embodying this feature is shown in FIGS. 2, 3 and 5.

Figure 2:
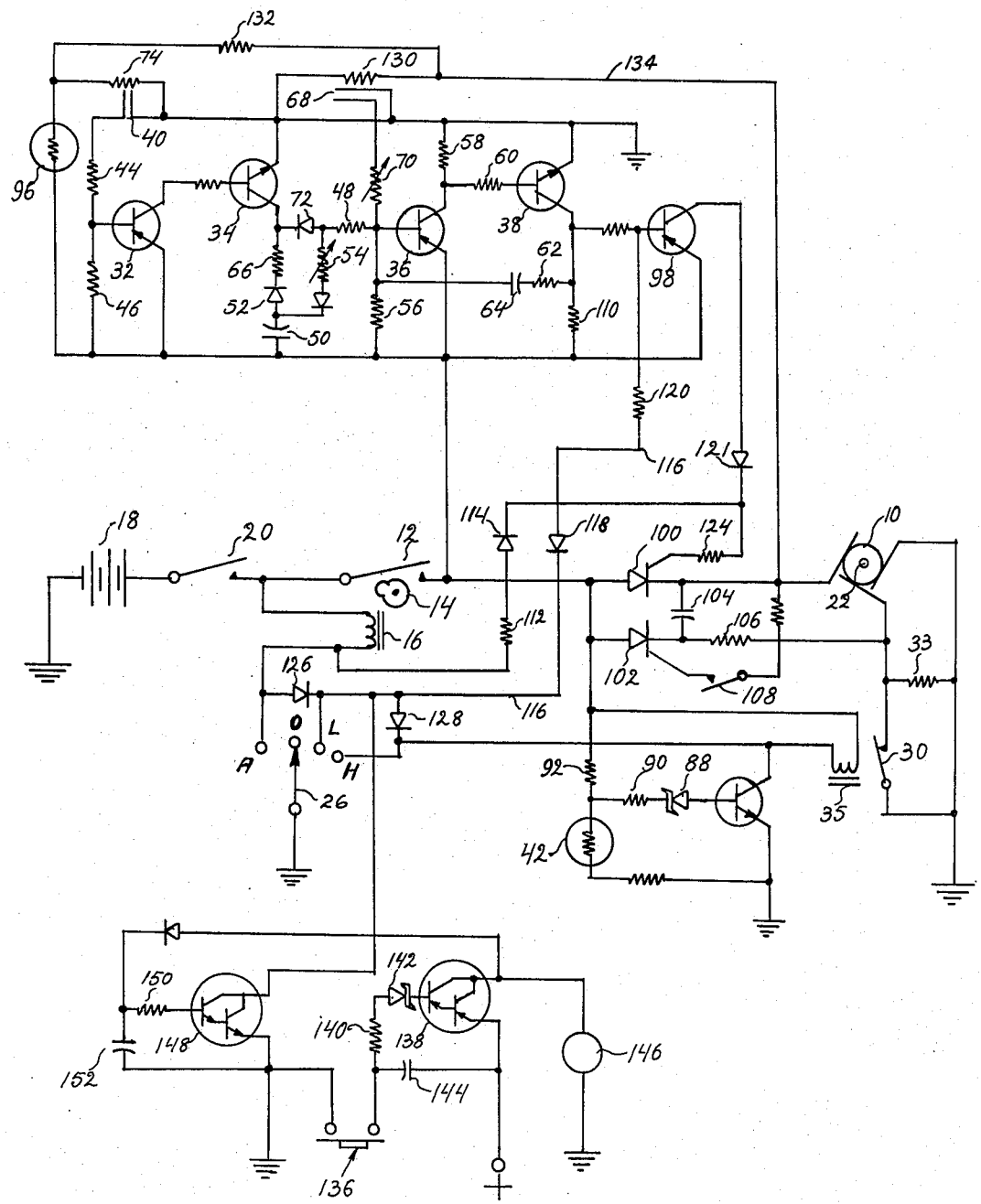
Figure 3:
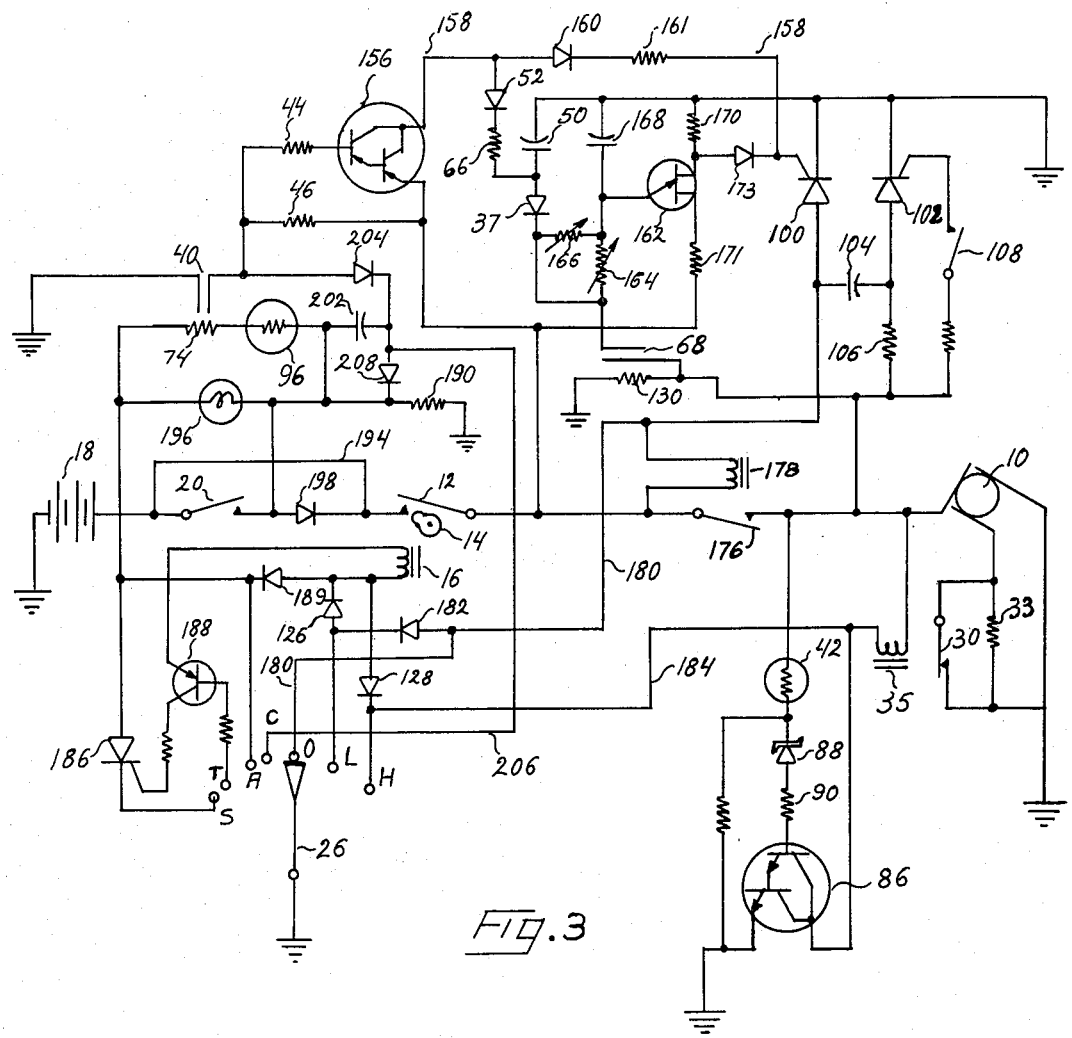

FIG. 2 shows the same type of wiper system shown in FIG. 1 with additional control means for preventing the wiper blades from retracting into recessed park position following each intermittent wiping cycle. In addition, FIG. 2 shows a windshield washer system also controlled automatically.

In the circuit shown in FIG. 2 a PNP transistor 98 is added to the control circuit of transistors 32,34, 36,38 to trigger SCR 100 into conduction whenever transistors 36,38 and 98 conduct. SCR 100 is in series with parking switch 12 and should be rated to carry the load of the wiper motor 10. A second smaller SCR 102 is connected in parallel with SCR 100. Capacitor 104 charges through resistor 106 whenever SCR 100 is conducting. Switch 108 is preferably a reed switch actuated via a magnet affixed to the linkage connecting the wiper blades with output shaft 22. Switch 108 is adapted to close whenever the wiper blades are at the end of the normal operating stroke designated NS in FIG. 10. When switch 108 closes, SCR 102 is triggered and capacitor 104 discharges across SCR 100. If transistors 36,38,98 are off when switch 108 closes, SCR 100 will be turned off and motor 10 stopped to park the blades at the NS position. If, on the other hand, transistors 36,38,98 are conducting when switch 108 closes, SCR 100 will not be turned off and motor 10 simply continues to run.

In this embodiment relay coil 16 stays energized whenever switch arm 26 makes with contact A. The load required for the repeated turn off and turn on action of transistors 36,38 is provided by resistor 110. Whenever switch arm 26 is returned to contact 0, relay coil 16 is de-energized and positive potential is supplied through the relay coil 16, resistor 112 and diode 114 to the gate of SCR 100. As a result, motor 10 continues to run until switch 12 is opened by cam 14, which, as described earlier in connection with FIG. 1, occurs when the wiper blades reach the depressed park position. When switch 12 opens, the supply of positive potential to the control circuit via conductor 78 is also cut off.

When switch arm 26 makes with contact L or H negative potential is supplied to the base of PNP transistor 98 via conductor 116, diode 118 and resistor 120. The collector of transistor 98 is connected to the gate of SCR 100 via diode 121 and resistor 124. Thus, when arm 26 makes with contact L or H wiper motor 10 runs continuously at either low or high speed. When switch arm 26 makes with contact A the negative potential via conductor 116 to transistor 98 is blocked by diode 126. Diode 128 blocks negative potential to relay coil 35 when switch arm 26 makes with contact L so that the wiper motor runs at continuous low speed.

For automatic operation at low speed the two previously described sensors 40 and 68 are employed. Whenever sensor 40 is activated by moisture precipitation, transistors 32,36 conduct and the wiper operates continuously as previously described in connection with FIG. 1. In the arrangement of FIG. 2 sensor 40 is preferably heated continuously to a maximum predetermined temperature by heater 74. This is to insure that in light rain sensor 40 dries quickly following each wetting so that preferably only one wiping cycle is generated following each wetting. If sensor 40 is of the type where spaced apart electrodes are bridged by moisture or water drops as shown in FIGS. 7 through 11, the active area of the sensor should be reduced to a practical minimum to reduce the probability of the sensor being too frequently wetted in light rain. Also, the spacing between the electrodes may be somewhat greater than the spacing of electrodes on a sensor designed to produce intermittent operation. Thermistor 96, having a positive heat coefficient, can be placed in series with heater 74 to provide more constant heating for sensor 40. Thermistor 96 is shielded from falling rain or snow, but is exposed to air flow. Sensor 40 should be so mounted that it is readily wetted by falling rain drops or snow flakes and by the road back-spray from passing vehicles.

Intermittent automatic operation of the wiper system shown in FIG. 2 is primarily controlled by sensor 68. Sensor 68 should be dimensioned and the electrodes spaced sufficiently close to insure that in drizzle and light rain it will be more readily wetted than sensor 40. The input potential from sensor 68 to the base of transistor 36 is controlled by variable resistor 70 which is set at a sufficiently high value to cause transistors 36,38 to be repeatedly turned on and turned off as previously described in connection with FIG. 1. This repeated on and off action (which produces intermittent operation of the wiper motor) continues as long as only sensor 68 remains wetted. No amount of wetting of sensor 68 can switch the wiper into continuous operation. Thus, the heating of sensor 68 is less critical than is the case with sensor 40. Heating of sensor 68 is employed only to prevent the wiper from operating intermittently for too long a period after the rain has stopped. Sensor 68 may be heated very lightly and continuously by heater 130 through resistor 132. Heating of sensor 68 may be intensified during each cycle of operation of wiper motor 10 by supplying positive potential to heater 130 directly through conductor 134, bypassing resistor 132 when SCR 100 conducts and wiper motor 10 is running. Alternatively, resistor 132 can be eliminated and sensor 68 heated only during the running of wiper motor 10. In any event, it is necessary to maintain sensor 68 at a sufficiently low temperature or reduce its temperature sufficiently when the wiper motor is not running so that its electrodes can be bridged by a moisture film precipitated on the sensor in a fog.

The sensitivity of the intermittent control circuit of transistors 36,38 is determined by the value of resistor 56. The value of this resistance should be sufficiently high so that the wiper will not start merely due to high humidity weather when a vision obstructing moisture film does not form on the windshield and the sensor is cold. The circuit of capacitor 50 may be used in conjunction with sensor 68 to obtain better control of the intermittent operation. When capacitor 50 is employed, the circuit for intermittent operation under the control of sensor 68 can be programmed to have a longer pause between cycles than when capacitor 50 is not employed. By employing capacitor 50 in conjunction with sensor 68 the circuit can be so programmed that each time sensor 40 dries the pauses between the immediately following intermittent wiping cycles are relatively short. This results from the fact that when sensor 40 dries capacitor 50 has already been fully charged, and, since sensor 68 is wet, the combined input to the base of transistor 36 from capacitor 50 and sensor 68 reduces the duration of the off time of transistors 36,38. As capacitor 50 discharges, intermittent operation continues under the control of sensor 68 and the pause between cycles increases in duration.

The automatic operation of the washer system shown in FIG. 2 is initiated when manual switch 136 is momentarily closed. Switch 136 is spring biased to open position and remains closed only as long as it is depressed. When switch 136 is closed, negative potential is supplied to the base of PNP Darlington amplifier transistor 138 through resistor 140 and Zener diode 142 and is also supplied to capacitor 144. Transistor 138 is turned on and its output energizes washer pump 146. The output of transistor 138 also supplies positive potential to the base of transistor 148 through resistor 150 and to capacitor 152. Transistor 148 conducts, supplying negative potential to relay coil 16 via conductor 154. Relay coil 16 closes switch 12, and the washer pump 146 and wiper motor 10 are energized. When switch 136 opens, capacitor 144 begins to discharge into the base of transistor 138 until the capacitor's charge drops below the breakdown voltage of Zener diode 142. With input potential cut off, transistor 138 is turned off and washer pump 146 stops. Transistor 148, however, is sustained in conduction by the charge of capacitor 152 and the windshield wiper, therefore, continues to operate until capacitor 152 is discharged in the same manner as when switch arm 26 makes with contact L, as previously described. The function of transistor 148 is to operate the windshield wiper for one, two or more wiping cycles after the washer spray from pump 146 has stopped and, thus, insure that all of the spray on the windshield is wiped clean. Capacitor 152 begins to discharge as soon as transistor 138 is turned off. The size of capacitor 152 determines the number of wiping cycles executed following termination of the washer action. When capacitor 152 is discharged and transistor 148 is turned off, relay coil 16 is de-energized and wiper motor 10 stops after the wiper blades reach the recessed park position. The size of capacitor 144 can be selected to produce any desired duration of washer operation after switch 136 is opened. Operation of the washer for this pre-programmed period is obtained even when switch 136 is actuated momentarily. If switch 136 is maintained in closed position, the operation of the washer is extended in duration for the time period during which the switch is maintained closed.

Figure 6:
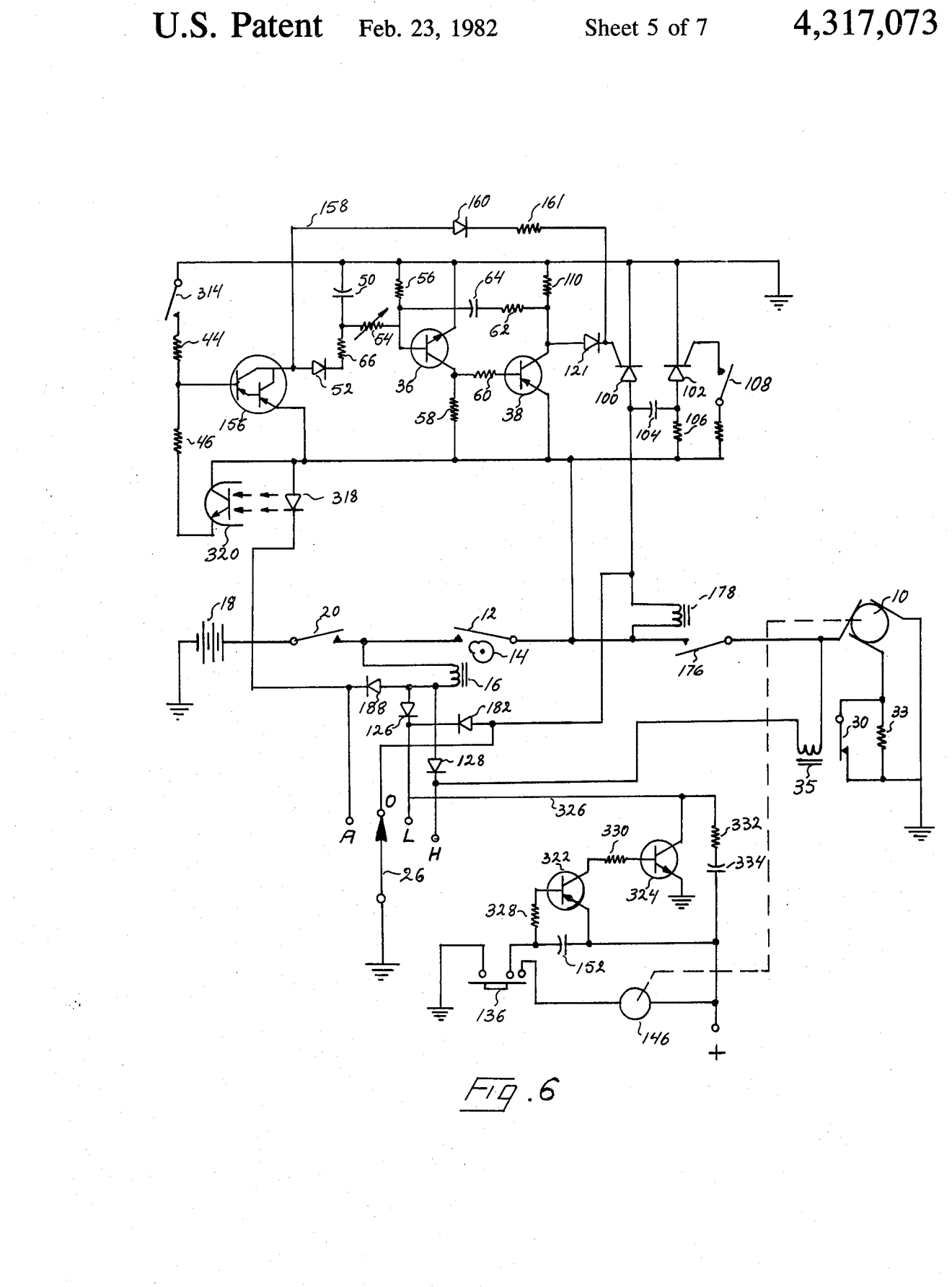

Some washer pump mechanisms are mechanically latched to the wiper system whenever the washer is actuated. After the pump has produced a predetermined number of water sprays the latch is released, the washer pump stops, and the windshield wiper continues to run until it is manually turned off. With this type of washer system transistor 138 is omitted and switch 136 and the base of transistor 148 are connected to the positive side of capacitor 152. With the circuit so modified, when switch 136 is momentarily closed, positive potential is supplied to the base of transistor 148, capacitor 152 and the relay actuated latching mechanism of the washer mechanism. The washer and wiper will then operate together until the washer mechanism is disengaged and the wiper will stop automatically shortly thereafter as programmed by the size of capacitor 152. A slight variation of this arrangement is shown in FIG. 6.

FIG. 3 shows another modified automatic control circuit employed with the same type of wiper system shown in FIGS. 1 and 2. In this circuit a PNP Darlington amplifier transistor 156 is substituted for transistors 32,34 in the previously described embodiments. Whenever sensor 40 is wetted transistor 156 conducts, triggering SCR 100 into conduction via conductor 158, diode 160 and resistor 161. Triggering of SCR 100 causes the wiper to operate continuously as long as sensor 40 remains sufficiently wet. In this embodiment intermittent operation of the wiper is controlled by unijunction transistor (UJT) 162 and sensor 68. Resistor 171 connects base 1 of transistor 162 to positive potential and resistor 172 connects the base 2 of the transistor to negative potential. Whenever transistor 156 conducts, capacitor 50 is charged via diode 52 and resistor 66. Whenever transistor 156 stops conducting, capacitor 50 begins to discharge into capacitor 168 via diode 37 and resistor 164. When the emitter voltage of UJT 162 peaks, transistor 162 turns on and discharges capacitor 168 via resistor 170. A trigger pulse through diode 173 to the gate of SCR 100 triggers it into conduction. When the emitter of transistor 162 drops to a value of about two volts, it ceases to conduct, the transistor turns off, and the cycle is repeated. The frequency of the intermittent cycles will depend upon the values of resistor 164 and capacitor 168. The number of cycles is determined by the size of capacitor 50.

If desired, instead of utilizing capacitor 50, sensor 68 (which is less sensitive than sensor 40) may be used to alone produce intermittent operation as long as sensor 68 is maintained sufficiently wetted. However, as distinguished from the circuits shown in FIGS. 1 and 2 where the wiper operates substantially immediately upon wetting of sensor 68, in the arrangement shown in FIG. 3 in intermittent operation the wiper begins to operate only after capacitor 168 is charged following wetting of sensor 68. On the other hand, if sensor 68 is used in combination with capacitor 50, the wiper will operate intermittently following the drying of sensor 40 until capacitor 50 is discharged, even if sensor 68 is dry. Alternatively, resistor 166 may be added and conductor 174 omitted. In this event, when sensor 40 is dry and sensor 68 is wetted the circuit can be programmed by the setting of resistors 164,166 so that the frequency of intermittent wiper operation will be higher until capacitor 50 is discharged, as previously described in connection with FIG. 2.

The arrangement shown in FIG. 3 is such that, whenever the control system is activated, the wiper will start operating in a continuous mode and continue to so operate for a predetermined time interval. This is a desirable feature since, otherwise, if the rain condition initially called for intermittent operation (when the rain starts), the wiper blades would execute just one or two strokes and then pause. If at this time the windshield were dirty, the intermittent operation would tend to smear the dirt rather than clean the windshield.

To obtain initial continuous operation for a predetermined time period whenever the wiper is switched to automatic control, the negative side of a capacitor 202 is connected to the base of transistor 156 via diode 204 and resistor 44 and to switch contact C via conductor 206. Contacts A and C are briefly shorted when switch arm 26 is moved to make with contacts A or S. When contacts A and C are shorted capacitor 202 is charged and transistor 156 conducts. Capacitor 202 begins to discharge following the brief shorting between contacts A and C. The wiper will operate continuously until capacitor 202 is discharged. The length of the operation will depend upon the size of capacitor 202. Diode 204 prevents capacitor 202 from being charged whenever sensor 40 is wetted. Without diode 204 the wiper would operate continuously after sensor 40 dried until capacitor 202 discharged. Although this feature is only shown in connection with the embodiment in FIG. 3, it is obvious that the other embodiments shown and described can be modified in an obvious manner to charge a capacitor when the automatic control system is activated so that wiper operation will be initiated with continuous operation until the capacitor is discharged.

In the embodiment shown in FIG. 3 the operation of SCR 100, SCR 102, capacitor 104 and switch 108 is substantially the same as described in connection with FIG. 2, the only difference being that SCR 100 can be smaller since the load of motor 10 is carried by relay switch 176, which is connected in series with switch 12.

By energizing the motor through relay switch 176 rather than through SCR 100, the speed of the motor is not reduced by a voltage drop. Relay coil 178 is connected in series with switch 12. Relay coil 178 is connected at one end to positive potential through switch 12. The other end of relay coil 178 is connected to negative potential whenever SCR 100 conducts or switch arm 26 makes with fixed contact O, L or H. Whenever relay coil 178 is energized, normally open switch 176 is closed. When switch arm 26 makes with contact O (which is off position), relay coil 178 is supplied with negative potential via conductor 180. Relay coil 178 remains energized until the wiper blades reach the recessed park position and switch 12 opens. When switch arm 26 makes with contact L, relay coil 178 is energized via diode 182 and conductor 180. Simultaneously, relay coil 16 is also energized via diode 126. When switch arm 26 makes with contact H, relay coil 16 is energized via diode 128. Relay coil 178 is also energized via diode 128 and conductor 180. Simultaneously, relay coil 35 is energized via conductor 184 and wiper motor 10 runs at high speed. When switch arm 26 makes with contact A only relay coil 16 is energized and relay coil 178 is energized by the control circuit of transistor 156 and UJT 162 in response to the wetting of sensors 40,68.

As mentioned previously, it is very advantageous to switch the automatic control system off permanently whenever the ignition switch is turned off. This feature prevents the control circuit from being activated automatically when the ignition switch is turned on again.

In the arrangement shown in FIG. 3 automatic turn off is accomplished with SCR 186. When switch arm 26 is moved to make with switch contact S, it is adapted to short contacts S and T briefly. When this occurs, negative potential is supplied to the cathode of SCR 186 and momentarily to the base of PNP transistor 188. The transistor conducts, triggering SCR 186 into conduction and energizing relay coil 16. Switch 12 closes, supplying positive potential to the control circuit and sensor heaters via conductor 78. Whenever ignition switch 20 is turned off, SCR 186 is turned off. When the ignition switch is turned on again, SCR 186 remains off. Since relay coil 16 is de-energized and switch 12 is closed, the wiper blades move automatically to recessed park position because SCR 100 is maintained in conduction by positive potential to its gate via heater 74, indicator lamp 196, conductor 190 and diode 192. As a result, relay coil 178 remains energized until switch 12 opens.

Negative potential is supplied to the cathode of SCR 186 through switch arm 26 rather than directly from ground so that a failure of SCR 186 in on state will not interfere with the manual turn off of the wiper system. In providing two settings for the automatic control (contacts A and S), the operator has a choice of switching arm 26 to make with contact A (which requires manual turn off) or to make with contact S to stop operation automatically when the ignition is turned off. To re-activate the control circuit after it has been turned off by SCR 186, switch arm 26 need only be moved to short contacts S and T and then returned to contact S again. Contact O is used to turn the wiper off manually when either under manual or automatic control.

It is very desirable to have a wiper continue operation after the ignition switch is turned off until the wiper blades are retracted to recessed park position. This prevents the blades from being parked in random positions on the windshield where they are apt to freeze in a freezing rain. This also eliminates the annoyance of having the blades move to recessed park position whenever the ignition switch is turned on again. The arrangement shown in FIG. 3 provides this feature.

To continue wiper operation after the ignition is turned off a conductor 194 is provided to bypass the ignition switch and to supply potential only to the wiper system. Diode 198 prevents relay coil 16 from being energized via conductor 194 when the ignition switch is opened. Thus, when the ignition switch is opened, relay coil 16 is de-energized but switch 12 remains closed (as explained previously) until opened by cam 14. Switch 176 remains closed since relay coil 178 is being energized by SCR 100. SCR 100 is maintained in conduction by transistor 156, the base of which is supplied with negative potential via resistor 190, diodes 208,204 and resistor 44. Indicator lamp 196 indicates whether the automatic control system is on or off during periodic absence of rain while driving. Diode 189 blocks negative potential to the indicator lamp and sensor heater 74 when the wiper operates under manual control.

Figure 3A:
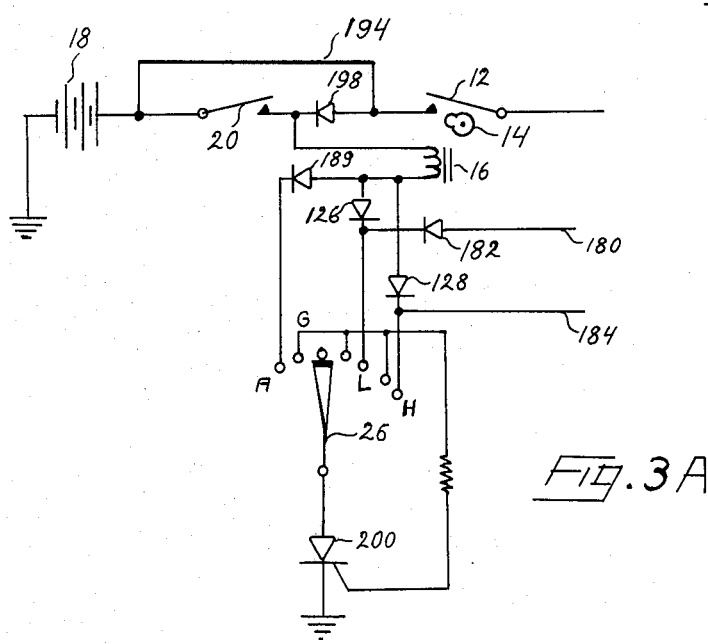

Alternatively, as shown in FIG. 3A, I may dispense with SCR 186, transistor 188, contacts S and T and connect SCR 200 in series with switch arm 26 to ground as shown. The gate of SCR 200 is connected to three intermediate contacts designated G. A contact G is located close to each of the main contacts A, L and H. Whenever switch arm 26 is advanced toward any of the main contacts it shorts briefly the intermediate contact G and the main contact. SCR 200 is triggered and remains in conduction when the short is broken and switch arm 26 remains in contact with any of the main contacts. When the ignition switch is turned off, SCR 200 is also turned off and will not be retriggered again when the ignition switch is turned on again. To start the wiper again the switch arm must be moved to short a contact G with any of the adjacent main contacts. By employing conductor 194 and diode 198 in conjunction with SCR 200 whenever the ignition key is turned off the wiper will continue to operate until the wiper blades reach the recessed park position, following which the wiper is turned off automatically as previously described in connection with FIG. 3. The automatic turn off feature employing SCR 200 or other suitable switch means to accomplish the same results is not limited for use only with an automatic wiper control system; it can be used with any conventional manually controlled wiper system. For example, the arrangement shown in FIG. 3A in connection with contacts L and H can be employed with a manually controlled wiper system by simply eliminating contact A.

In the circuit shown in FIG. 3 high speed operation of the wiper is obtained when sensor 42 is sufficiently cooled by a heavy rain to trigger transistor 86 as described in connection with FIG. 1. It will be appreciated that the invention is not limited to the use of a thermistor as the high speed sensor. Any sensor responsive only to heavy rain can be employed with a suitable circuit as shown in other embodiments described herein.

Figure 4:
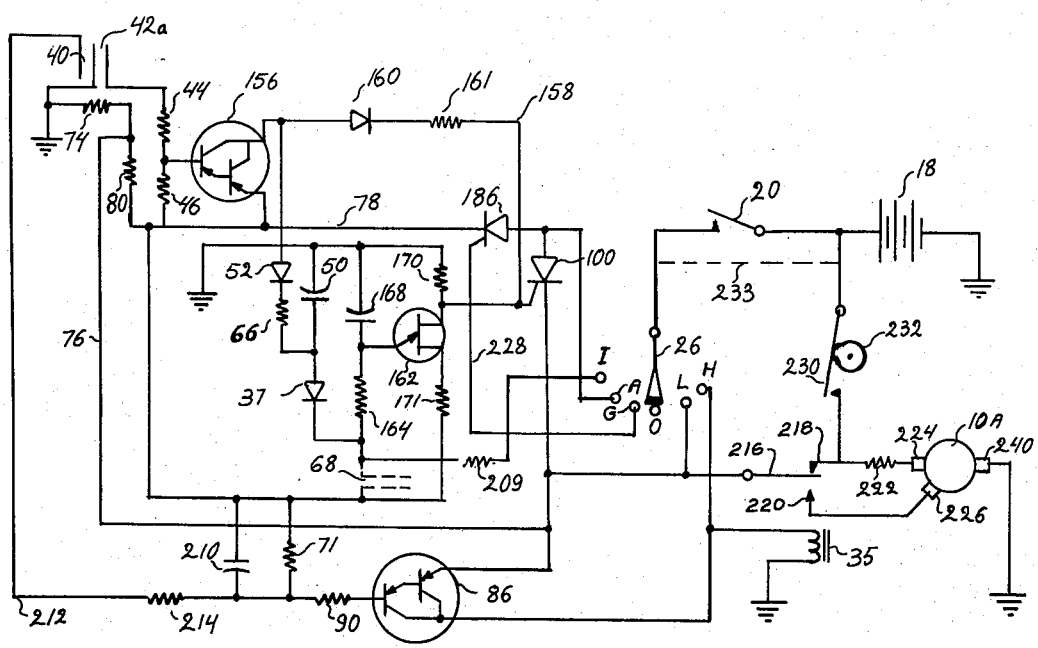

In FIG. 4 there is shown a conventional wiper system which does not embody a recessed park mechanism, as is the case with many less expensive vehicles. The electronic control circuit of transistor 156 and UJT 162 is the same as shown and described in FIG. 3. Sensor 68 is shown in broken lines and can be employed, if desired, in the same manner as shown and described in FIG. 3. Sensor 40 and high speed sensor 42a are arranged on one sensor body and heated by common heater 74. In this arrangement high speed sensor 42a comprises spaced electrodes separated by an air gap as shown in FIGS. 8 through 10. The heating may be continuous light or medium. If desired, the heating of these sensors can be intensified or effected only during the running of the wiper motor by bypassing resistor 80 as previously described in connection with FIG. 1. To insure activation of sensor 40 in fog, the temperature of this sensor should be reduced sufficiently by resistor 80 or the absence of any heating to permit accumulation of moisture on it after the wiper motor stops running. Alternatively, sensor 40 may be heated continuously to the maximum desired temperature, in which case a sensor 68, adapted to respond to fog, drizzle and light rain, is employed as described in connection with the previous embodiments.

Operation of the wiper in fog conditions can also be achieved by intermittent operation under manual control instead of utilizing a sensor 68 or reducing the temperature of sensor 40 while the motor is not running. This can be readily accomplished by means of an additional contact I adapted to be bridged with contact A when switch arm 26 is activated to make with contact I. When switch arm 26 makes with contacts I and A, the control circuit is activated and positive potential is also supplied to charge capacitor 168 via potentiometer 209 and resistor 164. This produces intermittent operation of the wiper motor in the manner previously described in connection with the operation of resistor 164, capacitor 168 and UJT 162. However, since potentiometer 209 is in series with resistor 164, the pause between intermittent cycles under manual control can be extended to any desired duration. With switch arm 26 positioned so that it bridges contacts A and I, whenever sensor 40 is wetted, it charges capacitor 50 and triggers SCR 100 into conduction. Thus sensor 40, when activated, immediately overrides the intermittent operation resulting from the closing of switch arm 26 with contacts A and I. When sensor 40 is de-activated, the wiper operates intermittently under the control of capacitor 50. It is desirable to set potentiometer 209 to obtain a substantially longer pause between intermittent cycles than when the wiper is operating under the control of capacitor 50. Until capacitor 50 is discharged, the pause between cycles will be determined by the setting of resistor 164. After capacitor 50 is discharged the pause between intermittent cycles will be determined by the setting of potentiometer 209. This manual intermittent control can be employed with any of the embodiments disclosed in place of sensor 68.

The high speed control circuit of transistor 86 shown in FIG. 4 is adapted to respond to wetting of sensor 42a and switch the wiper into high speed operation only after this sensor is wetted for a predetermined period. When the electrodes of sensor 42a are bridged with water, capacitor 210 is charged negatively via conductor 212 and resistor 214. After capacitor 210 is charged sufficiently and the negative potential thereon is sufficient to overcome the positive bias of resistor 92, negative potential will be supplied to the base of transistor 86 and cause it to conduct. Consequently, whenever sensor 42a is activated only briefly or infrequently capacitor 210 will not be sufficiently charged to turn on transistor 86. Sustained heavy wetting of sensor 42a is required to charge capacitor 210 sufficiently to cause transistor 86 to conduct and thereby switch the wiper into high speed operation. The size of capacitor 210 and the value of resistors 214,92 will determine the time delay from the moment when the electrodes of sensor 42a are bridged by water and the moment when transistor 86 is turned on. A practical time delay range is between 1–3 seconds. Sensor 42a is designed to be cleared of water very rapidly, and, unless it is being activated continuously or frequently enough, the wiper will not switch to high speed operation. Without such a delay the wiper could be switched momentarily from low to high speed operation, even in medium rain or snow, especially when the raindrops or snowflakes are large. Such erratic switching between low and high speeds is undesirable. Once capacitor 210 is charged it will sustain transistor 86 in conduction for brief periods even though momentarily the electrodes of sensor 42a may not be bridged by water. During this momentary lack of activation of sensor 42a transistor 86 is maintained in conduction by the charge on capacitor 210. Thus, the delay in turn on and turn off of transistor 86 insures smooth operation of the wiper at high speed and is especially advantageous with sensors which are de-activated rapidly as hereinafter described. Where the high speed sensor is in the form of a thermistor, capacitor 210 can be dispensed with. The delayed response time in switching the wiper into and from high speed may be controlled by the time constant of the thermistor. When transistor 86 in FIG. 4 is off, relay coil 35 is deenergized. Since switch arm 216 is biased to make with contact 218, current then flows to the low speed brush 224 of motor 10A through a torque limiting resistor 222. When transistor 86 is on, switch arm 216 makes with contact 220 and current is fed directly to the high speed brush 226 and the motor runs at high speed.

In FIG. 4 the wiper is switched to automatic control when switch arm 26 makes with contact A, thus supplying positive potential to emitter of transistor 156, to the base 2 of UJT 162 through resistor 171 and to sensor heater 74 via conductor 78. To obtain the advantages of automatic turn off whenever the ignition switch is opened and then re-closed, (this feature having been described with the arrangements shown in FIGS. 1 and 3), SCR 186 may be provided. When switch arm 26 is moved to contact A it briefly shorts contacts A and G, triggering SCR 186 into conduction via conductor 228. However, if arm 26 remains in contact with contact A and the ignition switch is turned off, SCR 186 is deenergized and the automatic control system is turned off and cannot be re-activated until switch arm 26 is returned to short contacts A and G.

By connecting a conventional parking switch 230 of the non-recessing type to the battery in advance of the ignition switch as shown, the wiper will not be stopped at random when the ignition switch is turned off, but will continue to operate until the wiper blades reach their normal park position, at which point parking switch 230 is opened by cam 232 linked mechanically to the wiper motor. If parking of the wiper blades after the ignition switch is turned off is not desired, parking switch 230 may be connected to the battery beyond the ignition switch as shown by the broken line conductor 233. In either event, by reason of SCR 186 the wiper will not start again when the ignition switch is turned on again. To switch the wiper to automatic control again switch arm 26 must be returned to contact O, which is off position, and then to A position again. If it is desired to continue the wiper operation until the wiper blades reach the normal park position at the end of their stroke (NS in FIG. 11), after the ignition switch is turned off, even when the wiper is under manual control, SCR 200 may be employed in series with switch arm 26 in the same manner as shown and described in connection with FIG. 3A. It will be appreciated that in FIGS. 3, 3A and 4 the contacts G and T which trigger SCR 186 are located in advance of the main contact with which these triggering contacts are associated. However, if the wiper control switch has a spring loaded contact arm 26, the triggering contacts can be located beyond their associated main contacts so that the switch arm will be automatically returned when manually released to make with the main contacts after the triggering contacts have been shorted.

The wiper system shown in FIG. 4 can be operated manually at low speed when switch arm 26 makes with contact L. When switch arm 26 is moved to make with contact H, it is adapted to short contacts L and H. Positive potential is supplied to wiper motor 10A via contact L and to relay coil 35 via contact H, causing the wiper motor to operate at high speed.

FIG. 5 shows the automatic control system employed with a wiper mechanism of another conventional type in which the rotation of wiper motor 10B is automatically reversed when the wiper switch is turned off for retracting the wiper blades to the recessed park position. Two switch arms 26+ and 26− are mechanically linked together for simultaneous operation. When switch arm 26+ makes with contact A, the wiper system is switched to automatic control and positive potential is supplied to the anode of SCR 100 and to the control circuit of UJT 162 via conductor 234. When SCR 100 conducts, positive potential flows to brush 224 of wiper motor 10B via conductor 260. Simultaneously, negative potential is supplied to brush 240 via switch arm 26−, contact A, conductors 236,268, and normally closed switch 238. Whenever SCR 100 conducts, the wiper operates at low speed. Parking cam 232 opens switch 230 once during each wiping cycle. If there is no positive potential supplied to the gate of SCR 100 when switch 230 opens, the wiper motor stops with the wiper blades positioned in the normal park position near the lower edge of the windshield. When any suitable high speed control circuit energizes relay coil 35, switch arm 238 makes with contact 242 and closes the circuit to high speed brush 226 and the wiper operates at high speed.

To turn off the control system automatically when the ignition switch is opened, the control circuit is activated by switch 244 with switch arms 26+,26− in off position. SCR 186 is utilized to energize relay coil 243 when switch contacts 244a are momentarily closed. This momentarily closes a circuit between the anode and the gate of SCR 186, triggering it into conduction and relay coil 243 is energized. Movable contact 246 breaks contact with normally closed contact 248 and makes with contact 250. This supplies negative potential to brush 240 or 226 of the wiper motor 10B conductors 236,268 and switch arm 238. The second movable contact 252 of the relay breaks with normally closed contact 254 and makes with contact 256. Positive potential is supplied to the wiper motor via conductor 234, SCR 100, conductor 260 and brush 224. Whenever SCR 100 conducts, the wiper motor runs at low speed or high speed depending on whether switch arm 238 closes the circuit to brush 240 or to brush 226.

When it is desired to stop the wiper and retract the blades to recessed park position contacts 244b are momentarily closed. This shunts the anode and the cathode of SCR 186 and turns it off. Relay coil 243 is thus deenergized and contacts 246,252 return to the normally closed position. With switch arms 26+ and 26− in off position, negative potential is supplied to the wiper motor via closed contacts 246,248, conductors 258,260 and brush 224. Positive potential is supplied to the wiper motor via closed contacts 252,254, conductors 262,268, switch arm 238 and brush 240. This reverses the direction of rotation of wiper motor 10B and lengthens the blade linkage slightly as is conventional with this type of wiper mechanism to park the wiper blades in the recessed park position designated RP in FIG. 11. When cam 232 opens switch 230, the wiper motor is de-energized.

When the wiper system is switched to automatic control by SCR 186 as previously described and is operating at the time that the ignition switch is turned off, the wiper blades will stop at random in the field of vision on the windshield. When the ignition switch is turned on again the wiper will automatically recess park the blades (switch arms 26+,26− are at the 0 position). However, if the ignition switch is by-passed via conductor 194, when the ignition switch is turned off the supply of positive potential is maintained only to the wiper motor which will continue to run until the blades are retracted to the recessed park position, at which point switch 230 is opened by cam 232 and stops wiper operation. Diode 198 blocks positive potential to SCR 186 and relay coil 243 via by-pass conductor 194 so that SCR 100 is turned off when the ignition switch is turned off.

In manual operation of the arrangement shown in FIG. 5 when both switch arms 26+, 26− make with contacts H or L, positive potential flow remains unchanged to brush 224 while negative potential is switched to either brush 226 or 240, causing the wiper motor to run at either high or low speed, respectively.

Any one of the automatic control circuits shown in this application (with the exception of that illustrated in FIG. 1) can be employed with the wiper system shown in FIG. 5. In FIG. 5 the automatic control circuit of UJT transistor 162 operates as follows to produce intermittent operation of the wiper: When sensor 68 is wetted, capacitor 168 is charged via variable resistor 164 and when the emitter voltage reaches peak, the UJT turns on, discharging capacitor 168 through resistor 170 and a pulse is supplied to the gate of SCR 100, triggering it into conduction. When the emitter voltage drops to about 2 volts, it ceases to conduct so that the UJT turns off and its cycle is repeated. The frequency of repetition will be determined by the size of capacitor 168 and the setting of resistor 164. These can be selected to repeat the cycle every 4 to 10 seconds or more. Any substantial resistance across the moisture that bridges the electrodes of sensor 68 will reduce the frequency, but no amount of wetting of sensor 68 can accelerate the above predetermined maximum rate.

A second sensor 40 is employed to automatically control the low speed continuous operation of the wiper motor. When sensor 40 is sufficiently wetted, capacitor 264 is charged via resistor 266. Capacitor 264 is substantially smaller than capacitor 168, and, consequently, the UJT fires very rapidly so that SCR 100 is substantially immediately triggered into conduction following each opening of switch 230 by am 232. As long as sensor 40 remains sufficiently wetted the wiper operates continuously at low speed.

Resistor 269 determines the sensitivity of the circuit associated with sensor 40 and resistor 270 determines the sensitivity of the circuit associated with sensor 68. Diode 272 prevents charging of capacitor 264 via sensor 68. Diode 274 prevents capacitor 168 from being charged via sensor 40.

To prevent corrosion of the sensor electrodes, it is necessary to maintain the input potential at a minimum practical level in all embodiments. The desired RC time constant of this circuit should be obtained with small capacitors and high resistances in series with sensors instead of larger capacitors and lower resistances. The heating arrangement for sensors 40,68 is not shown in FIG. 5 as it has been clearly shown and described in previous embodiments.

To insure that the automatic control circuit will not merely turn the wiper on when it starts raining and turn it off when it stops raining, means and methods are provided according to the present invention to operate the wiper system as required by the amount of moisture encountered in heavy fog, drizzle or light rain, medium and heavy rain and/or various intensities of road backspray from passing vehicles. These means comprise various types of sensors. Their sensitivity is determined by the type of sensors, their size and spacing of electrodes and predetermined rate of clearing of sensors together with the predetermined sensitivity of the control circuits, the speed and type of response to wetting or other methods of actuation of sensing means. For example, when three sensors are employed the sensor designated 68 in the drawings is adapted to produce only intermittent operation and is made very sensitive by having electrodes spaced closely together so that it can be readily bridged by moisture forming on the sensor in heavy fog and/or light drizzle. If clearing of sensor 68 is accomplished by heating the sensor, it should be so effected that it will not prevent the moisture film from forming on the sensor in fog. It is therefore advantageous to heat sensor 68 only during the running of the wiper motor or heat it lightly continuously and intensify the heating during the running of the wiper motor. This sensor should also be large enough to insure its activation even in light rain. The electronic circuits associated with the intermittent sensor 68 are adapted to operate the wiper intermittently while the sensor remains wetted and the remaining sensors are not activated. No amount of wetting of the intermittent sensor will shorten the pause between intermittent cycles of operation below a predetermined minimum duration. Any substantial resistance offered by the very small amount of moisture bridging sensor electrodes can lengthen the pause. Any periodic lack of wetting of sensor 68 will automatically produce an overriding off period of wiper operation.

The electronic circuit associated with intermittent sensor 68 can be adapted to respond substantially immediately to initial wetting of the sensor following each clearing or drying as described in connection with FIGS. 1 and 2. Alternatively, as shown in FIGS. 3 through 5, the control circuit may be adapted to respond to such wetting of sensor 68 with a delay so that in a light drizzle or rain the small droplets may dry off before the wiper motor is energized. Consequently, in very light rain and conditions where the rain droplets dry rapidly on the windshield and the sensor, the control circuit will not activate the wiper system even though the sensor may be repeatedly wetted. This type of arrangement may be preferred over one where each such light or brief wetting will produce a wiping cycle. With arrangements according to the present invention clearing or drying of the intermittent sensor is required only to terminate the intermittent operation of the wiper. Clearing of the intermittent sensor by heating is preferred over merely placing it in the path of the wiper blades or permitting the sensor to air dry. The latter methods are not very effective on cold rainy days and are unreliable in freezing weather.

Sensor 40 for continuous operation should be of limited size to reduce the probability of too frequent rewetting. I have obtained very satisfactory results with sensors 40 having an active area between one-half to one square inch covered with chromium plated electrodes 1/32" wide and spaced apart about 1/32 to 1/16" when the sensors are used for both continuous and intermittent operation. When sensor 40 is used in combination with a sensor 68, sensor 40 should be heated to a higher temperature than sensor 68 so that whenever the latter is wetted in light rain it will dry very rapidly. When sensor 40 is adapted to dry rapidly the wiper operation is sustained in intermittent mode during a light rain and the off pause is shortened only occasionally when sensor 40 is briefly re-wetted and dried.

Each of the control circuits described is adapted to respond substantially immediately to the wetting of sensor 40 so that, whenever wetting of this sensor occurs, intermittent operation is cancelled for as long as the sensor remains wetted. Even when a single sensor 40 is used to control both intermittent and continuous low speed operation, intermittent operation is not initiated until sensor 40 dries. This fast response of the circuit to wetting of sensor 40 is very essential in case of sudden road back-spray from passing vehicles which may occur at any time during an off pause in intermittent operation.

When the electronic circuit employs sensor 40 in conjunction with sensor 68 it is preferable to heat sensor 40 continuously to maintain it at a maximum desired temperature in order to obtain the fastest possible drying action. Although the sensor is adapted to dry quickly in light rain, as the wetting increases in frequency and volume it overcomes the ability of the sensor to dry and the wiper automatically switches to continuous operation. Thus, in a medium rain sensor 40 will not dry and the wiper will be sustained in continuous low speed operation until the intensity of the rain either diminishes or increases. When rain intensity diminishes the wiper will automatically revert back to intermittent operation. On the other hand, if rain intensity increases, the wiper automatically switches to high speed continuous operation under the control of the high speed sensor.

Sensor 42 for high speed operation and the related electronic circuit associated therewith are not adapted to respond to either fog, light or medium rain. When sensor 42 comprises a thermistor, its heat will prevent moisture and fog from accumulating thereon. Occasional raindrops in light or medium rain will not cool the thermistor sufficiently to trigger the control circuit associated with the sensor. If, on the other hand, the high speed sensor 42 comprises a sensor having electrodes adapted to be bridged by rain water, the heating of the sensor and the circuit associated therewith prevents it from operating the wiper motor in light rain or fog. If the high speed sensor is cleared only by heating, it should be heated to an even higher temperature than sensor 40 and preferably be of smaller size than sensor 40. Whenever intermittent and continuous low speed operation is controlled by only one sensor 40 as described, it is necessary to maintain the sensor at a sufficiently high temperature so that it will dry rapidly in light rain. If it is desired to activate the sensor in fog, its temperature should be reduced sufficiently when the wiper motor is not running.

FIG. 6 illustrates the same type of conventional wiper mechanism as shown and described in FIGS. 1, 2 and 3. The sensor for the control circuit in FIG. 6 comprises a visible or infrared light emitter 318. When switch arm 26 makes with contact A, relay coil 16 is energized together with light emitter 318. by suitable optical means, e.g., collimating lenses, small apertures, etc., the light from emitter 318 is directed to the lens of a light detector in the form of a phototransistor 320, causing it to conduct. As long as the phototransistor 320 conducts, the base of transistor 156 cannot be saturated negatively. Thus, transistor 156 will not conduct. Resistor 46 has a substantially lower value than resistor 44 which connects the base of transistor 156 to the negative potential. When the light beam from the light emitter 318 to the detector 320 is interrupted, detector 320 instantaneously stops conducting for the duration of the interruption—no matter how brief. When this occurs the base of transistor 156 becomes immediately saturated negatively via resistor 44 and transistor 156 conducts. This causes SCR 100 to be triggered via conductor 158, diode 60 and resistor 161. Simultaneously, capacitor 50 is charged via diode 52 and resistor 66. Each interruption of the light beam will cause triggering of SCR 100 and charging of capacitor 50. Although the interruption of the light beam may be extremely brief, once SCR 100 is triggered the wiper will operate for at least a complete wiping cycle and until SCR 100 is turned off by the action of switch 108 and SCR 102 as previously described in connection with FIG. 3. As long as the light beam is being repeatedly interrupted in medium heavy rain, SCR 100 will be sustained in conduction and the wiper will operate continuously at low speed. In very light rain, however, the interruption of the light beam will be less frequent and can be very erratic. Vision could be impaired before the next interruption of the light beam occurs and it is therefore necessary to sustain the wiper in intermittent operation by the charge accumulated on capacitor 50 during conduction of transistor 156. Whenever transistor 156 stops conducting, capacitor 50 begins to discharge into the base of NPN transistor 36. This causes transistors 36,38 to conduct. Transistor 38 is a PNP transistor and supplies positive potential to the gate of SCR 100 via diode 121.

The circuit of transistors 36,38 functions in the same manner as the circuit of transistors 36,38 in FIGS. 1 and 2 previously described, the only difference being that transistor 36 in this embodiment is a NPN transistor and transistor 38 is a PNP transistor. As is the case with the circuit shown in FIG. 1, the frequency of the repetitive turn on and turn off of transistors 36, 38 will depend upon the value of resistors 54,56, the size of capacitor 64, the value of resistor 62 and the value of the load (which in this case is resistor 110 rather than relay coil 16). Since the actuation of phototransistor 320 in this embodiment may be much briefer than the duration of wetting of a sensor where the electrodes are bridged by raindrops, it is desirable to charge capacitor 50 fully at a much faster rate. If deemed necessary, instead of charging capacitor 50 directly by the output of transistor 156 as shown, the output can be amplified in any suitable manner (not shown) which will insure full charge of capacitor 50 during such brief conduction of transistor 156.

In any light detection arrangement where the wiper blades move across the light path between the emitter and detector, detector 320 will be turned off briefly. Means must be provided to prevent this action from triggering transistor 156. One suitable means is the switch shown at 314 in FIG. 6 which is normally closed, but is synchronized with the wiper blades to open and interrupt the supply of negative potential to the base of transistor 156 each time the wiper blade crosses the path of the light beam between the emitter and detector. Switch 314 may be a reed switch operated by a magnet on the wiper blade linkage.

With the arrangement shown in FIG. 6 any high speed control circuit can be employed with any suitable high speed sensor to energize relay coil 35 for high speed operation of the wiper motor in response to heavy rain.

FIG. 6 also illustrates the automatic operation of a washer system of the type which is mechanically latched to the wiper motor for a predetermined duration every time the washer is actuated. Whenever switch 136, which is spring biased to open, is momentarily closed, negative potential is supplied to the base of transistor 322, causing it to conduct together with transistor 324. Transistor 324 energizes relay coil 16 via conductor 326 and diode 126. Simultaneously, when switch 136 closes, negative potential is supplied to capacitor 152, charging it instantaneously. Upon closing switch 136 washer pump 146 is actuated and latched to the drive mechanism of the wiper motor 10. When switch 136 is released it opens and capacitor 152 begins to discharge through resistor 328 into the base of transistor 322 which conducts. Transistor 322, being connected to the base of transistor 324 through 330, maintains transistor 324 in conduction. After the washer pump 146 has produced a fixed number of washing cycles, the latching mechanism is automatically disengaged in a conventional manner and the pump is turned off. Capacitor 152 is so selected that it will continue to discharge for at least one, two or more strokes after the washer pump action has stopped. This insures complese clearing of the windshield following the washing operation. When capacitor 152 is discharged, relay coil 16 is de-energized and the wiper blades are retracted to the recessed park position as previously described in connection with FIGS. 1, 2 and 3. Resistor 332 and capacitor 334 are used to stabilize the output of the circuit of transistors 322,324.

FIG. 7 illustrates the same conventional wiper system and substantially the same automatic control circuit for low speed shown in FIG. 4. However, in the control circuit of FIG. 7 transistor 156 and UJT 162 are controlled by light emitter 318 and light detector 320. Whenever the light beam is interrupted and detector 320 is turned off, transistor 156 conducts, triggering SCR 100 into conduction and simultaneously charging capacitor 50. Intermittent operation continues until capacitor 50 is discharged as previously described in connection with FIG. 4. The high speed operation of the wiper system shown in FIG. 7 is controlled by a second light emitter 336 and light detector 338. Whenever the light beam from emitter 336 to detector 338 is interrupted, transistor 86 conducts. Depending upon the frequency of interruption, a steady or rapidly repetitive output of transistor 86 charges capacitor 340 through resistor 352 and supplies positive potential to the base of NPN transistor 342 via resistor 344. Transistor 342 turns on transistor 346 via resistor 348. The output of transistor 346 energizes relay coil 35. Relay coil 35 closes switch contacts 216,220 and places the wiper motor 10A into high speed operation as previously described in connection with FIG. 4. The light detector 338 for high speed operation is made less sensitive by having the light beam from emitter 336 shorter and somewhat wider than the light beam between emitter 318 and detector 320 for low speed operation.

Although the circuit in FIG. 7 does not embody an arrangement for producing automatic shut off of the automatic control system as described in connection with FIG. 4, such an arrangement can be readily incorporated in the same manner as previously described.

In FIG. 4 the switch arm 26 is adapted to short contacts L and H whenever the wiper operates at high speed under manual control. This is to insure current flow to the motor from contact L and simultaneously from contact H to relay coil 35. In FIG. 7 diode 350 blocks positive potential to relay coil 35 whenever SCR 100 conducts or when switch arm 26 makes with contact L. When switch arm 26 makes with contact H, relay coil 35 is energized and positive potential is supplied to motor 10A via diode 350 to operate the motor at high speed.

In the arrangement illustrated in FIG. 7 the connection of capacitor 340 to transistor 86 through resistor 352 performs a dual function: It prevents transistors 342,346 from being turned on when the light beam is interrupted only occasionally (as would occur in a light rain). Likewise, in a heavy rain, when the light beam would occasionally not be interrupted, this arrangement sustains transistors 342,346 in conduction during such brief moments and prevents a frequent interruption of the high speed operation, thus insuring continuity of the wiping strokes. This arrangement is particularly advantageous when the high speed sensor and detector are both located exteriorly of the vehicle and so arranged that the light beam will be interrupted only by water drops in motion.

FIGS. 8 and 9 illustrate a sensor-heater unit 276 of the type designated 40,42a in FIG. 4. Sensor unit 276 would be mounted on the vehicle in the vertical position illustrated. A wire-wound heating element 290 is sandwiched between two layers of Pyrex glass 291, ceramic or other suitable heat resistant electrical insulating material. The ends of the heating element are designated 296,298. Metallic strips or wires 278,278a arranged in interdigital fashion comprise the sensor electrodes. These electrodes may be fused, bonded or plated to the outer surface of the forwardly facing glass layer 291. Electrodes 278a are interconnected at one end to a lead 280 and electrodes 278 are interconnected at the opposite end of the sensor to a lead 282. The sensor is connected to the ground potential of the vehicle by lead 280 and to the electronic control circuit by lead 282. The closely spaced electrodes 278,278a are adapted to be bridged by moisture film in fog or water drops and provide the function of sensor 40.

An additional electrode 284 is mounted on the sensor body so that a small air gap 285 is formed between this electrode and electrode 286 which is also connected to lead 280. If electrode 284 is mounted directly on the sensor body without air gap 285, the spacing would have to be substantially wider than the spacing between electrodes 278,278a. Even such wider spacing may render the sensor too sensitive in highly contaminated water and not sensitive enough in pure rain water. An air gap such as shown at 285 permits close spacing of the electrodes without rendering them too sensitive. In addition, the air gap promotes rapid clearing of the sensor without relying solely on heating. Electrodes 284,286 provide the function of sensor 42a in FIG. 4. The size of air gap 285 is such as to prevent bridging of electrodes 284,286 by a film of moisture or a small droplet of water so that the electronic control circuit cannot be actuated in fog, drizzle or light rain.

Electrode 284 is connected to the high speed control circuit by lead 288. Electrode 284 may comprise a metallic wire or a metal strip plated on or bonded to an insulating support in which a suitable resistance heater may be enclosed. While electrodes 284,286 cannot be bridged by fog, drizzle or light rain, they are spaced apart such that they are readily bridged by heavy rain or heavy road back-spray. To insure rapid clearing of the sensor following each such heavy wetting, the sensor is preferably mounted with electrodes 284,286 extending vertically so that the heavy water drops run down the electrodes by gravity and clear the air gap between them. Thus, clearing is very rapid even though the sensor is being substantially cooled during such heavy wetting. By experience I have found that a single pair of electrodes vertically arranged as shown is sufficient to control the high speed operation of the wipers. If desired, however, more electrodes can be used in the same fashion and separated from each other by an air gap. During warm weather the heating is not essential for clearing electrodes 284,286; however, heating is necessary in winter. On the other hand, heating is essential in both warm and cold weather for clearing electrodes 278,278a which control the low speed operation of the wipers in the continuous and intermittent modes of operation. Thus, sensor unit 276 shown in FIGS. 8 and 9 may comprise the only sensing means used on the vehicle, and, with the proper arrangement of the electronic circuitry as previously described, it can control the intermittent low speed, continuous and high speed operation.

FIG. 10 shows the cross section of a sensor generally similar in construction to that shown in FIGS. 8 and 9. However, in FIG. 10 the sensor is mounted on the vehicle so that electrode 284 extends horizontally above electrode 286. To facilitate clearing the gap between electrodes 284,286 of water, a wick 300 is provided. The wick may comprise a painted coating of any suitable water-absorbent fiber bonded to the back surface of the sensor and extending downwardly from between the electrodes as shown. Wick 300 is so arranged that a water drop that tends to bridge the gap between electrodes 284, 286 will not remain there but will be quickly conducted away. Thus, only a heavy rain will result in a more or less continuous bridging of electrodes 284,286.

FIG. 11 shows the front face of a sensor similar to that illustrated in FIG. 8 but utilizing a thermistor 42 instead of electrodes for controlling high speed operation. Thermistor 42 is mounted in heat exchange relation with a sensor heater 302 embedded in the body of the sensor. The thermistor controls the high speed operation as described in connection with FIG. 1. If supplemental heating of thermistor 42 by heater 302 is not desired or necessary, the thermistor may be mounted on the vehicle separately.

In FIG. 12 there is illustrated a lens of a vehicle light (which may be a headlight or an auxiliary light on the vehicle) adapted to be illuminated whenever the wiper system is switched on. Electrode strips 278, 278a are fused, bonded or plated to the lens of the light. The heat generated by the illuminated light serves to dry the sensor.

Figure 13:
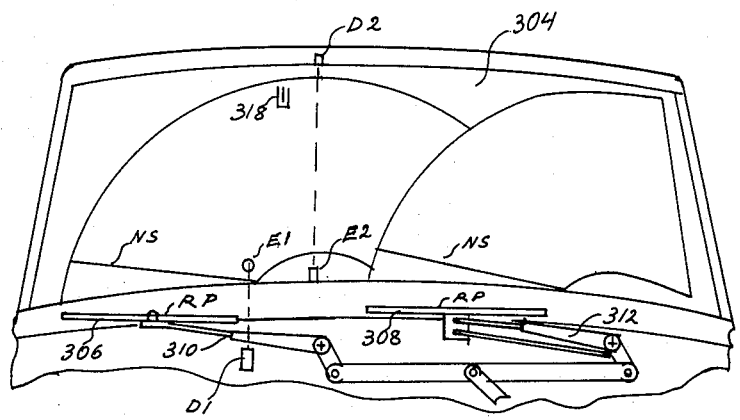
FIG. 13 is a front elevational view of a vehicle windshield showing the various positions assumed by the wiper blades and suitable locations for sensors employed with the control system.
Figure 14:
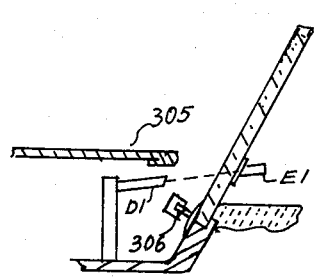
FIGS. 14 through 16 show various forms of light beam type sensor arrangements.

In FIGS. 13 through 17 there are illustrated several different arrangements of optical sensors usable with the electronic control circuits of this invention. FIGS. 13 and 14 show a vehicle windshield 304 and wiper blades 306,308 carried by arms 310,312 which oscillate across the surface of the windshield in a conventional manner. Position RP designates the position of the wiper blades in recessed park position. The position designated NS indicates the position of the wiper blades at the end of the normal wiping stroke. This is the position at which the wiper blades reverse their direction of travel in continuous operation. Also in intermittent operation position NS is where the wiper blade is adapted to park between operating cycles. NS also designates the park position of the wiper blades with a wiper mechanism of the type which does not incorporate a recessed park mechanism.

FIGS. 13 and 14 also show suitable positions of sensors in the form of light emitters and detectors adapted to generate and detect a light beam. Such light beams when scattered, reflected or otherwise interrupted by moisture or raindrops are adapted to actuate the electronic control circuit for automatic operation of the wiper system as described in connection with FIGS. 6 and 7. The light detector designated D1 is mounted on the outside of the vehicle, preferably under the rear edge of hood 305. The light emitter designated E1 is mounted inside the vehicle on or behind the windshield. The light beam from emitter E1 is so directed that the area or the point at which the light beam penetrates the windshield is repeatedly cleared by the oscillating wiper blades. With emitter E1 and detector D1 so arranged the wiper control circuit will be triggered whenever fog condenses on the windshield or whenever water drops on the windshield lie in the path of the beam. It will be appreciated that with the illustrated arrangement of E1 and D1 the light beam may also be interrupted by water drops falling between the emitter and the point at which the light beam passes through the windshield.

Figure 15:
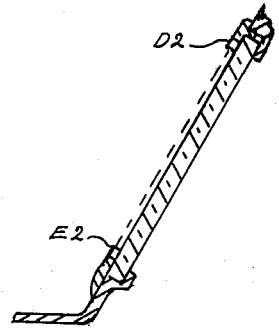

In FIGS. 13 and 15 there is also illustrated a light emitter designated E2 and a light detector designated D2 so positioned that the light beam does not penetrate the windshield but lies parallel to the windshield from top to bottom and closely adjacent the plane of the windshield. Any water drops falling in the path of the light beam would interrupt it. In addition, water drops which hit the windshield and rebound and scatter from it will also interrupt the light beam. However, this type of sensor will not respond to fog on the windshield as is the case with the previously described arrangement of emitter E1 and detector D1. Emitter E2 and detector D2 can be located and arranged to be wiped by suitable wipers (not shown) at the opposite ends of a wiper blade so as to be cleared of any water drops or snow that might accumulate on them.

Figure 16:
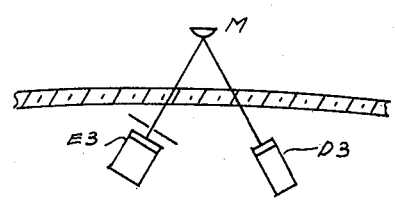

Another suitable light beam detector arrangement is shown in FIG. 16. Light emitter E3 and detector D3 are both placed behind the windshield. The light beam is reflected by the mirror M placed outside of the vehicle, preferably adjacent the rear edge of the hood. The emitted and reflected light beams lie in the path of travel of a wiper blade. The mirror may be located and arranged to be cleared by the wiper blades in a suitable manner. A mirror wiper may be mounted on the wiper arm for this purpose. Alternatively, mirror M may be protected by a suitable shield or placed under the rear edge of the hood so that its functioning will not be adversely affected by precipitation, dirt, etc.

Figure 17:
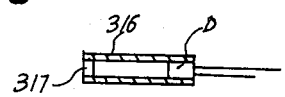
FIG. 17 shows the manner in which a light beam type sensor may be shielded from extraneous light rays.

FIG. 17 shows a detector D recessed deeply into a small tube, designated 316, the forward end of which is closed at its forward end by a transparent lens 317 which prevents the ingress of dirt, etc. into the tube and may serve to focus the light beam onto the detector. Detector D will only respond when it is directly aimed at the emitter. Alternatively, an infrared light emitting source may be utilized in combination with a complementary infrared detector to avoid any effect of extraneous light and any annoyance caused by the visible light beam in night driving. The desired narrow beam is obtained by the use of suitable optical devices. The sensitivity of the described optical sensors is determined by the width of the light beam and its length.

The sensors herein described may be used in various combinations. If an optical sensor is used for obtaining intermittent operation in fog or drizzle, a sensor which directs a light beam through the windshield is preferred. As shown in FIG. 6, the electronic control circuit employed may be adapted to respond to actuation of only one such sensor to operate the wiper intermittently and continuously at low speed in accordance with the intensity of precipitation. An additional sensor would then be employed for the high speed operation. Alternatively, a variety of sensor combinations may be used. One can combine heated sensors for intermittent and low speed continuous operation with an optical sensor for high speed operation. In another possible arrangement the type of sensor shown in FIG. 12 can be affixed or embedded in a windshield in the path of the wiper blades as indicated at 318 in FIG. 13 for intermittent operation. Any other suitable sensor, either a heated or an optical sensor, can be used for low speed continuous operation and for high speed operation.

With respect to automatic operation of the wiper motor at high speed, optical sensors or thermistors are preferred over sensors having electrodes that must be bridged by water, particularly those high speed sensors that rely solely on the wider spacing between the electrodes and do not employ an air gap such as shown in FIGS. 8 through 10. This preference is based upon the fact that the conductivity of water varies with the amount of impurities therein. Thus, a high speed sensor, the operation of which is predicated solely on the wider spacing of the electrodes and/or heating, may prove to be too sensitive when the water is contaminated and especially when it contains salt. This may cause the wiper to operate at high speed when it should operate at low speed. On the other hand, the same sensor may not respond at all in a very heavy continued rain where the rain water is relatively pure. Optical sensors and thermistors are not affected by variations in the conductivity of the water; such sensors are also not subject to corrosion. Accordingly, when optical sensors or thermistors are employed the input potential to the control circuits from the sensors need not be as low as would be required with electrode type sensors.

the terms "moisture sensor", "precipitation sensor" and "rain sensor" are employed in this description and the accompanying claims to broadly designate any of the types of sensors described.

What is claimed is:

1. An automatic control system for a windshield wiper mechanism driven by an electric motor comprising: an electronic control circuit having moisture activated means therein, said motor being energized in response to activation of the moisture activated means and being de-energized in response to de-activation of the moisture activated means; a manually operable switch member movable from an off position to a predetermined on position for energizing the electronic control circuit so as to condition the circuit to produce an output when the moisture activated means is activated, said electronic control circuit also including a capacitance means and a means momentarily contacted by said switch member for substantially immediately charging said capacitance means irrespective of the condition of the moisture activated means when said switch is moved from said off position to said on position, said circuit, when energized by actuation of said switch member, responding to the charge of the capacitance means to produce an output of predetermined duration and thereby energize the wiper motor for said duration until the capacitance means discharges whereby, when said switch member is moved to said on position, the motor is energized for said predetermined time period and thereafter the motor operates in response to activation of the moisture activated means.

* * * * *